United States Patent [19]

DePas, Sr.

[11] 4,088,375

[45] May 9, 1978

[54] AUTOMATIC SKID AND SPIN CONTROL SYSTEM FOR VEHICLE BRAKES AND METHOD

[75] Inventor: Laddie A. DePas, Sr., Louisville, Ky.

[73] Assignee: M. L. Miller, Louisville, Ky.

[21] Appl. No.: 640,865

[22] Filed: Dec. 15, 1975

[51] Int. Cl.² .......................... B60T 8/02; B60T 8/10
[52] U.S. Cl. .................................. 303/96; 137/627.5; 303/98; 303/115
[58] Field of Search ................ 303/102, 96, 109, 115, 303/114, 98, 116, 61; 137/627.5; 222/284, 194, 216

[56] References Cited

U.S. PATENT DOCUMENTS

| 2,423,057 | 6/1947 | Thomas | 303/98 |
|---|---|---|---|
| 3,388,951 | 6/1968 | Marcellos | 303/116 |
| 3,649,083 | 3/1972 | Depenheuer | 303/102 |
| 3,724,914 | 4/1973 | Skoyles | 303/61 |
| 3,893,535 | 7/1975 | Burckhardt | 303/96 |
| 3,910,643 | 10/1975 | Kobashi | 303/114 |

*Primary Examiner*—Trygve M. Blix
*Assistant Examiner*—Reinhard J. Eisenzopf
*Attorney, Agent, or Firm*—Maurice L. Miller, Jr.

[57] ABSTRACT

A fluid operated system for controlling a brake applicable to a vehicle wheel having a flywheel, driven by an unpowered vehicle wheel, connected to the vehicle brake pedal and adapted to disconnect the flywheel from the unpowered wheel to rotate independent thereof when the brake pedal is operated. Upon vehicle deceleration, the flywheel slides forward in the direction of vehicle movement due to inertia and slidably presses against a brake pad which decelerates the flywheel at a rate proportional to vehicle deceleration. A fluid operated valve having a housing containing spaced fluid inlet, storage and outlet chambers which open onto a concave base of the housing is employed to sense the rotational speed of the flywheel. A collar, connected to the flywheel so as to rotate in unison therewith, slidably engages the concave base and contains a slot which alternately connects the inlet and storage chambers and thereafter, the storage and outlet chambers together to generate a fluid output signal in the outlet chamber which is a function of the rotational speed of the flywheel. A wheel speed senser is used to sense the rotational speed of a vehicle wheel to which the brake is applied. A fluid valve, connected to the flywheel speed senser and the wheel speed sensor, generates a brake controlling response in accordance with a difference between the speeds of the wheel and vehicle and is operatively connected to the brake to limit the difference. Additional features include a manual override assembly which insures normal brake operation upon failure of the fluid operated system, and a pendulum arrangement associated with the flywheel to eliminate errors in vehicle speed sensing caused by gravity when the vehicle travels on steep inclines.

43 Claims, 19 Drawing Figures

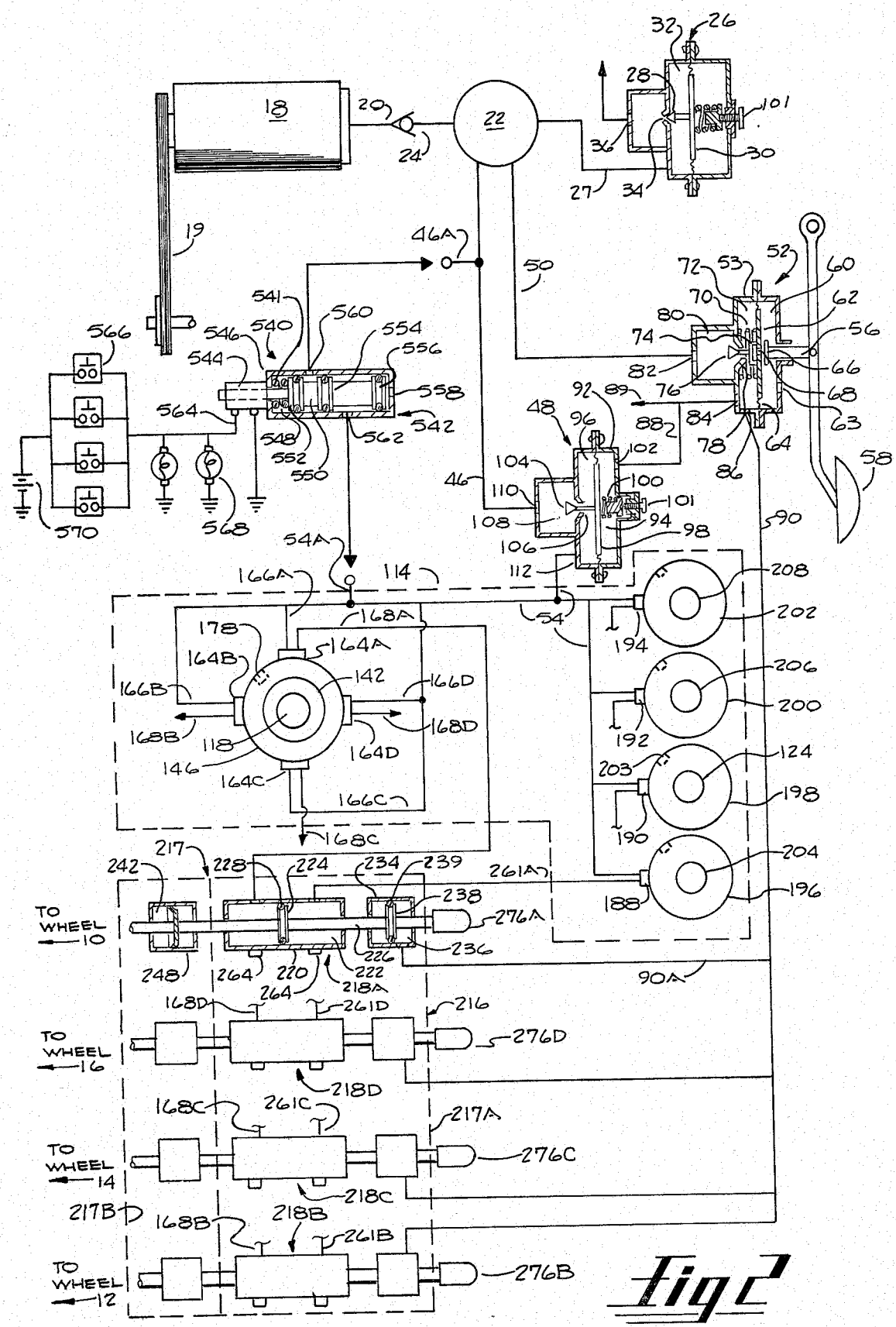

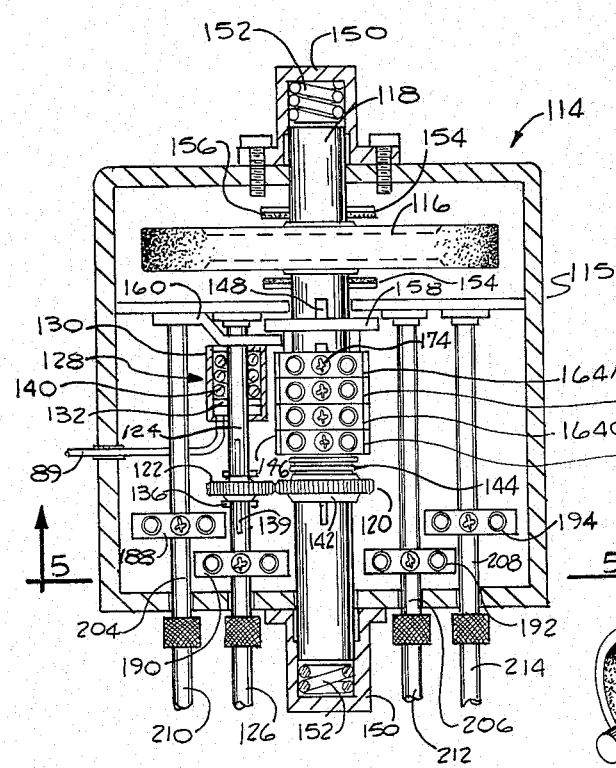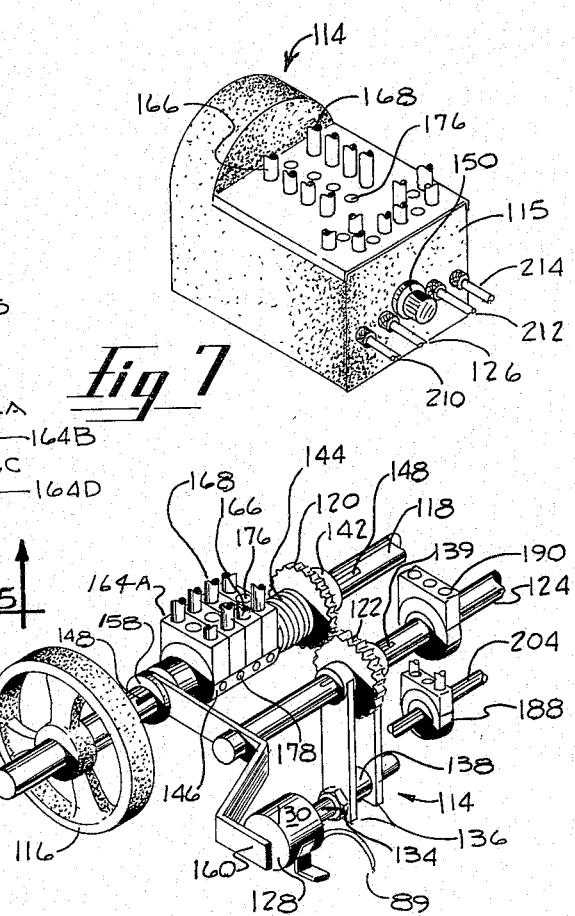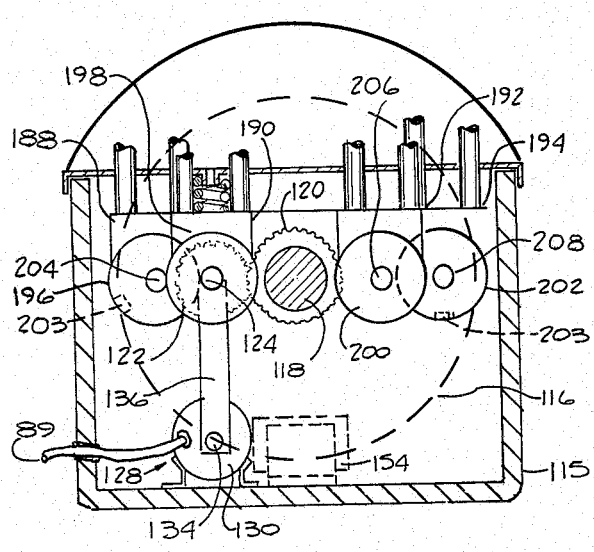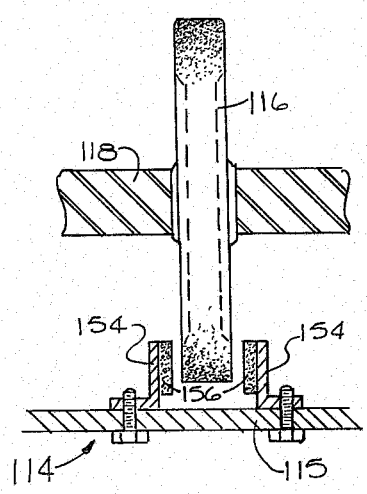

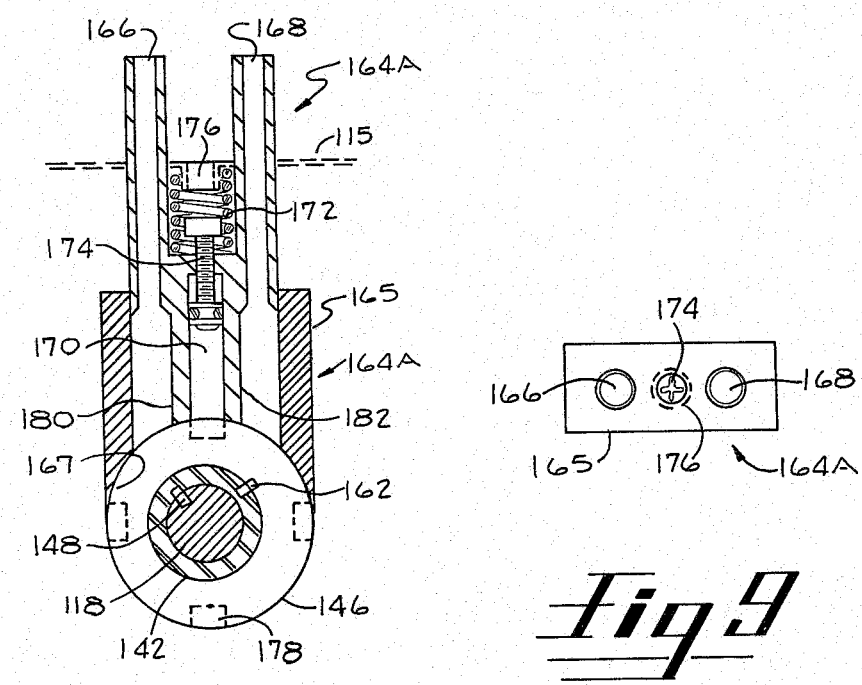
Fig 8
Fig 9
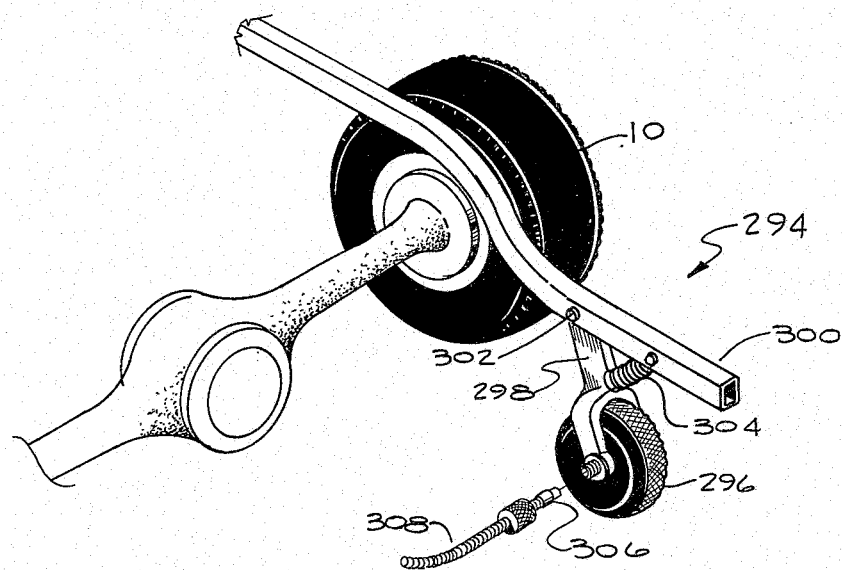
Fig 15

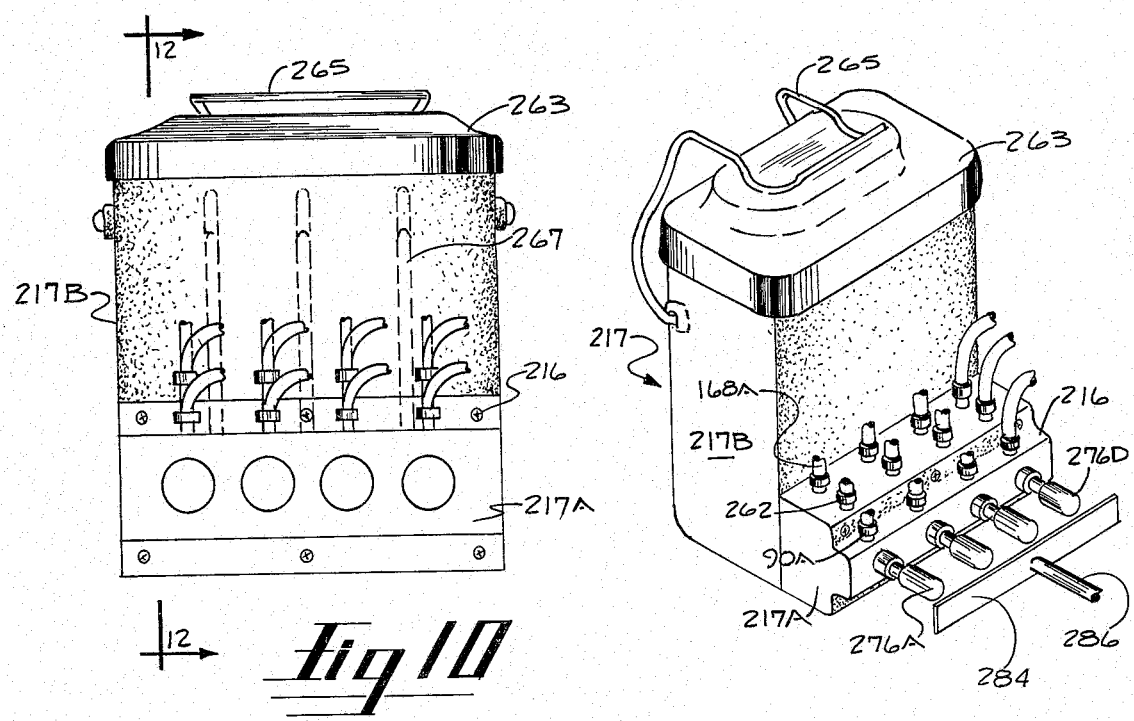
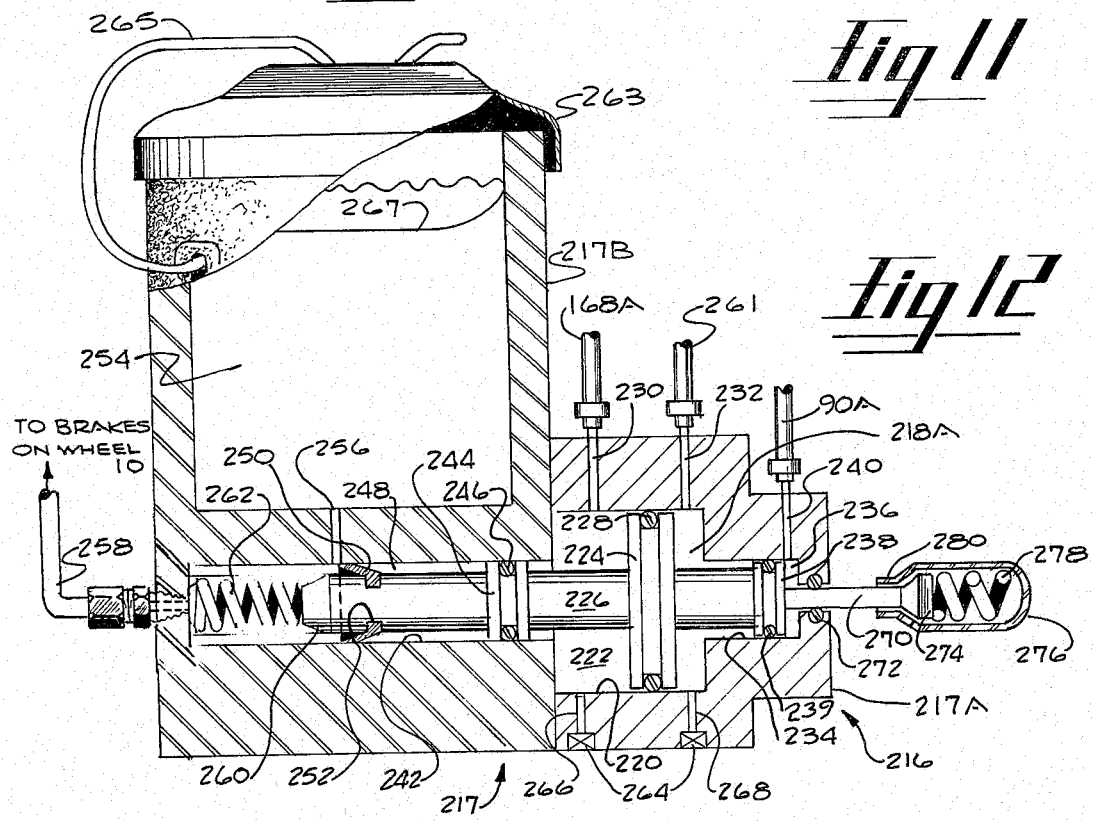
Fig 10
Fig 11
Fig 12

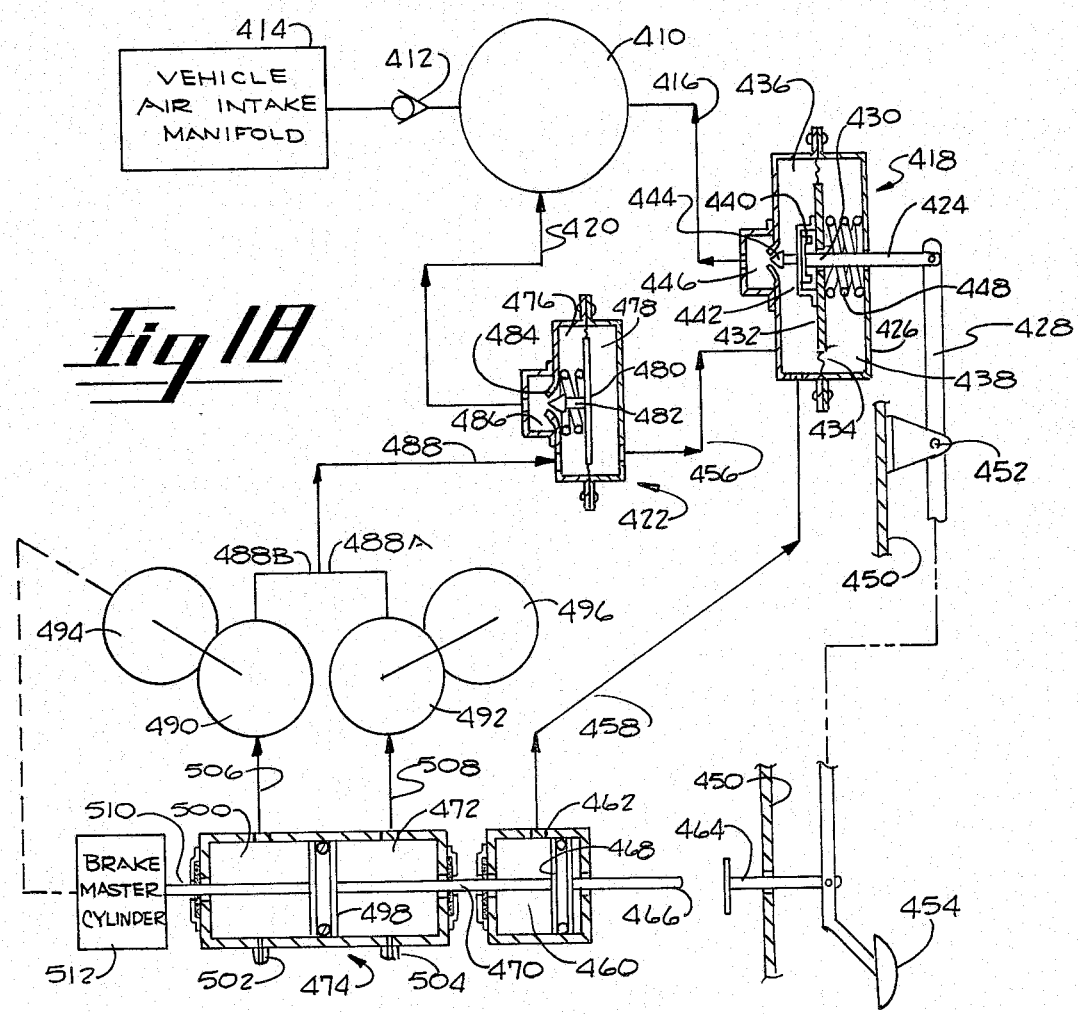
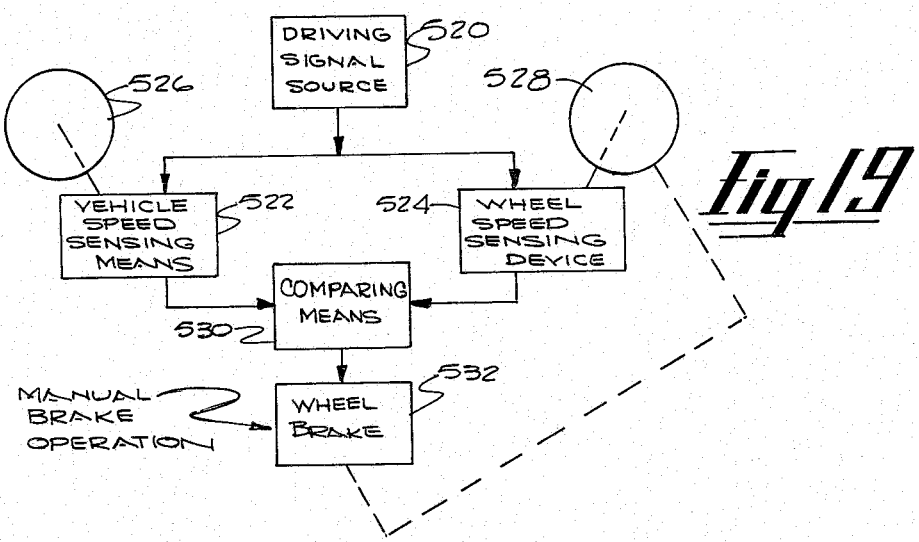

AUTOMATIC SKID AND SPIN CONTROL SYSTEM FOR VEHICLE BRAKES AND METHOD

BACKGROUND OF THE INVENTION

This invention relates generally to vehicle brake control systems for limiting the spinning of power driven vehicle wheels during actual or attempted vehicle acceleration, and for limiting the skidding of vehicle wheels to which brakes are applicable during actual or attempted vehicle deceleration, and various component elements of such systems.

Several systems for controlling vehicle brakes to inhibit locking or skidding of the wheels are known in the prior art. For example, see U.S. Pat. No. 2,068,370 issued to R. J. Bush on Jan. 19, 1937 and entitled, "Inertia Operated Control Device," which discloses the use of a rotating flywheel to inertially control the operation of the fluid valve, which valve, in turn, controls the maximum rate of deceleration of the vehicle wheel during the application of brakes thereto. U.S. Pat. No. 3,752,268 issued to Hans Gfeller on Aug. 14, 1973 and entitled, "Braking System" also discloses a flywheel to perform the same function using a different structural combination.

One difficulty encountered with these prior art systems, as illustrated by the previously cited reference patents, is that they provide means for unloading vehicle brakes at a preselected and fixed maximum rate, independent of and without regard to the actual rate of deceleration of the vehicle as a whole, whether the rate of vehicle deceleration be relatively great as when braking on dry pavement, or whether relatively small as when braking on solid ice. Because such systems are preset against an arbitrary standard or reference, they cannot thereafter differentiate between widely varying road conditions which cause widely varying rates of deceleration of a vehicle when braking is applied. Moreover, such prior art systems do not use the actual speed of the vehicle as a reference against which to compare the speed of each wheel to which brakes are applicable to determine when an acceptable wheel skid condition is being exceeded. Rather, such prior art systems compare the speed of the brakeable vehicle wheels to an arbitrary reference rate of decleration, not the actual vehicle deceleration rate.

Another disadvantage of the prior art brake control systems for inhibiting wheel skid conditions, is that they operate the unloading of the brakes on an interruptable and discontinuous basis wherein no anti-skid protection is afforded until the system responds to a preselected, idealized set of initial conditions, at which time a valve or switch is suddenly actuated to unload the vehicle brakes. There is no provision made for continuous unloading of the vehicle brakes at a rate dependent upon the difference in speed between the brakeable vehicle wheels and the vehicle as a whole, so as to limit the onset of a skid condition in a smooth and continuous manner.

Moreover, the prior art systems do not employ inertial means, such as a rotating flywheel to continuously measure the instantaneous speed of the vehicle while decelerating. Also, such prior art systems do not provide means for preventing the spinning or slipping of power driven vehicle wheels under conditions of rapid acceleration or attempted acceleration, as on ice, for example.

Those anti-skid systems of the prior art which utilize electrical and electronic circuitry have the additional disadvantage of being difficult and critical to adjust and of being susceptible to radio interference in some cases. Another difficulty encountered in the brake control systems of the prior art is that means for obtaining vehicle braking is lost upon failure of such systems for any reason.

My invention substantially overcomes these and other difficulties inherent in brake control systems of the prior art.

BRIEF SUMMARY OF THE INVENTION

It is an object of my invention to provide a vehicle brake control system which limits skidding of the vehicle wheels to which brakes are applicable, by comparing the speed of each such wheel with the actual speed of the vehicle as a whole, and by unloading the brakes applicable to such wheel in a smooth and continuous manner at a rate dependent upon the difference between the actual vehicle speed and the speed of such wheel.

It is still another object of my invention to provide a fluid operated vehicle brake control system.

It is yet another object of my invention to provide a vehicle brake control system which limits spinning or slipping of power driven vehicle wheels.

It is still another object of my invention to provide a vehicle brake control system which limits both skidding and spinning of the vehicle wheels under conditions of vehicle deceleration and acceleration, respectively.

It is also an object of my invention to provide an alternate flywheel inertial assembly for sensing vehicle speed which utilizes a pendulum arrangement to substantially minimize error in inertial measurement of vehicle speed which may result from vehicle travel on steep inclines.

It is another object of my invention to provide a road engaging wheel as an alternate means for continuously monitoring the approximate instantaneous speed of a vehicle.

It is an object of the present invention to provide a mechanical manual override brake control assembly to permit vehicle braking upon failure of an anti-skid or anti-spin brake control system.

It is also an object of my invention to provide a vacuum or fluid operated speed sensing valve for use in vehicle brake control systems.

It is an additional object of my invention to provide a centrifugal force operated assembly for generating a force representative of the speed of a vehicle and a wheel, and for comparing such speeds to generate fluid signals representative of any difference in such speeds.

It is also an object of the present invention to provide a fluid or vacuum operated mechanical brake control system for vehicles which is not susceptible to radio or other spurious electrical or electronic interference.

It is an object of the instant invention to provide a means for comparing fluid signals representative of the speed of a vehicle and the speed of each vehicle wheel, operatively associated with the brakes applicable to each wheel for loading or unloading the same in response to the difference in said signals, to minimize spinning or skidding of each of said wheels independent of one another.

Broadly, in accordance with my invention there is provided a system for automatically controlling a brake applicable to a wheel of a vehicle having vehicle speed monitoring means including a rotatable flywheel responsively connected to an unpowered wheel of the vehicle when a vehicle brake, manually applicable to a wheel of the vehicle, is inoperative. Means is provided for disconnecting the flywheel from the unpowered wheel for permitting the flywheel to rotate independent of the unpowered wheel when the brake is operative. Inertial means is included for frictionally decelerating the flywheel as a function of the rate of deceleration of the vehicle. Fluid valve means is responsively associated with the flywheel for generating a first fluid signal which is at least partially dependent upon the rotational speed of the flywheel. Wheel speed sensing means is responsively connected to the brake applicable wheel for generating a second fluid signal which is at least partially dependent upon the rotational speed of the brake applicable wheel. Comparing means is responsively connected to the monitoring and wheel speed sensing means for generating a response which is substantially proportional to a difference between the first and second signals, the comparing means being operatively associated with the brake to limit the difference.

The invention also includes a method for vehicle brake control including monitoring vehicle speed, sensing rotational speed of a vehicle wheel, comparing the vehicle and wheel speeds and operating said brake to limit the difference.

These and other objects of my invention will become apparent to those skilled in the art from the following detailed description and attached drawings upon which, by way of example, only the preferred embodiments of the subject invention are illustrated.

BRIEF DESCRIPTION OF THE DRAWINGS

FIG. 2 shows a schematic diagram of a fluid operated system, illustrating one preferred embodiment of the subject invention.

FIG. 3 shows a cross-sectional plan view of a means for sensing the speed of a vehicle and each of the wheels thereof and for generating fluid signals responsive thereto, illustrating another preferred embodiment of the instant invention.

FIG. 4 shows an oblique view of certain of the components of the means of FIG. 3.

FIG. 5 shows a cross-sectional end elevation view of the means of FIG. 3 as viewed along lines 5—5 thereof.

FIG. 6 shows a cross-sectional side elevation view of a portion of the means of FIG. 3.

FIG. 7 shows an oblique view of the means of FIG. 3.

FIG. 8 shows a cross-sectional end elevation view of a fluid operated vehicle speed sensing valve illustrating yet another preferred embodiment of the instant invention.

FIG. 9 shows a plan view of the vehicle speed sensing valve of FIG. 8.

FIG. 10 shows a front elevation view of a comparing means and vehicle brake master cylinder assembly adapted for use in the system of the instant invention, illustrating still another preferred embodiment thereof.

FIG. 11 is an oblique view of the comparing means and vehicle brake master cylinder of FIG. 10.

FIG. 12 shows a cross-sectional side elevation view of the comparing means and master cylinder assembly of FIGS. 10 and 11 as viewed along lines 12—12 of FIG. 10.

FIG. 15 shows an oblique projection of a road engaging wheel attached to the frame of a vehicle and adapted to roll freely in the path thereof, illustrating another preferred embodiment of the subject invention.

FIG. 18 shows, schematically, a vacuum operated system for automatically controlling a brake applicable to a vehicle wheel, illustrating yet another preferred embodiment of the subject invention.

FIG. 19 shows a functional block diagram illustrating the broad principal of operation of the system of the instant invention.

DESCRIPTION OF THE PREFERRED EMBODIMENTS

Figure 1:
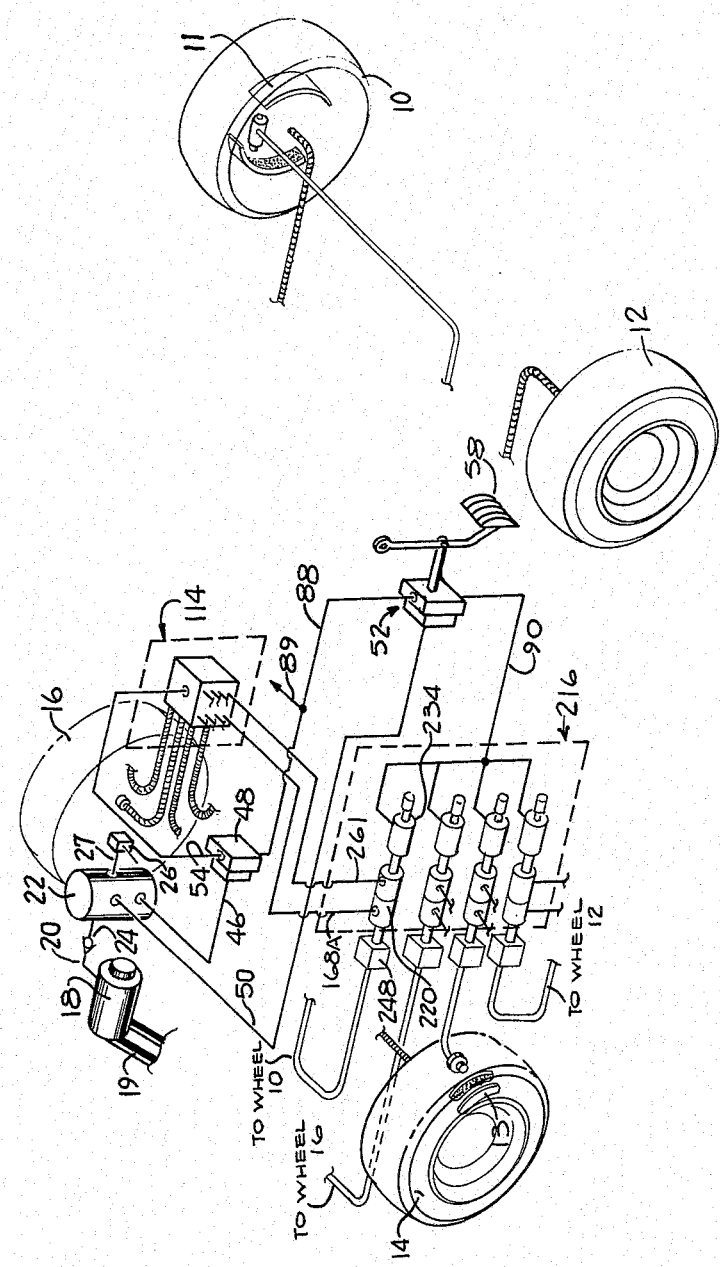
FIG. 1 shows an oblique view of a fluid operated brake control system for limiting skidding or spinning of the wheels of a vehicle, illustrating one preferred embodiment of the present invention.

Referring now to FIGS. 1-12 there is shown a fluid operated mechanical system and various components thereof for controlling the brakes of a wheeled vehicle to limit skidding and/or spinning of the wheels. The optional skid control feature of the system is adapted for use with any wheeled vehicle to which brakes are applicable such as an aircraft, passenger automobile, truck, bus, camper, motor home, trailer, tractor-trailer combination or other motorized or unmotorized vehicle. The optional spin control feature of the system is applicable to any such vehicle having power driven wheels. Though the skid or spin control portions of the system can be employed in a vehicle separately and apart from one another, a combination of both features in a single system is desirable because of their joint use of a number of components.

For illustrative purposes, the system of the subject example is shown in use with a vehicle having two power driven rear wheels 10 and 12, and two unpowered front wheels 14 and 16, such as may be found in many passenger automobiles in present use. The wheels 10, 12, 14 and 16 may be fitted with any suitable and well-known brake assembly such as, for example, the usual drum type brakes 11 on the rear wheels 10 and 12, and the usual disc type brakes 13 on the front wheels 14 and 16.

A source of pressurized driving fluid to operate the system is provided in any conventional manner such as, for example, by means of an air compressor 18 driven by a belt 19 attached to the vehicle engine, not shown. The air compressor often found in modern automobile air polution suppression systems can be shared to provide a suitable fluid source to operate the brake control system of the subject example in most cases. The compressor 18 supplies high pressure compressed air through an air line 20 to a pressure vessel or air storage reservoir 22. A one-way check valve 24 should be employed in the line 20 to prevent back-pressure on the compressor 18 from the reservoir 22 which might otherwise occur when the air pressure in the reservoir 22 exceeds the output air pressure generated by the compresser 18, such as might occur when the engine is turned off.

A suitable pressure relief valve 26 is attached to the reservoir 22 through an air line 27 to limit the maximum air pressure in the reservoir 22 to the maximum safe design limits of the brake control system. A suitable system can be designed for any desired maximum air pressure level within reason, such as 60 psi, for example. The valve 26 may include a tapered valve needle 28 attached to a spring loaded movable diaphragm 30 disposed within an air chamber 32 and aligned with a tapered valve seat defining an orifice 34. Spring bias against the diaphragm 30 maintains the needle 28 normally closed within the orifice 34 in an air tight manner, except when air pressure introduced into the chamber 32 through the line 27 exceeds the spring bias to move the needle 28 away from the orifice 34. During such latter conditions, high pressure air flows through the orifice 34 out of the chamber 32, from whence it is vented to the surrounding atmosphere through a vent port 36. Air escapes the valve 26 in this manner until the pressure in the line 27 and reservoir 22 returns within design limits, at which pressure the spring loaded diaphragm 30 is set to return to the normal state to close the orifice 34.

High pressure air from the reservoir 22 is conveyed by an air line 46 to a pressure control valve 48 and through an air line 50 to a brake control valve 52. The valve 52 includes a housing 53 and a movable plunger 56 attached at one end to a vehicle brake means or pedal 58. The other end of the plunger 56 projects into the housing 53 and an air chamber 60 toward one face of a movable diaphragm 62. The chamber 60 is vented to the surrounding atmosphere by means of a vent port 63. The diaphragm 62 is attached to the interior wall of the valve 52 in an air tight manner by means of a flexible resilient material 64 such as rubber or the like. On the free end of the plunger 56 there is preferably disposed a mass 66 of compressible resilient material such as rubber, spunge vinyl material or the like. The mass 66 is adapted to close a vent port 68 formed through the center of the diaphragm 62 when the brake pedal 58 is depressed to apply brakes to the vehicle. A coiled spring 70 is confined between the opposite face of the diaphragm 62 and the opposing wall of the housing 53 within a second air chamber 72. A rectangular or U-shaped mounting bracket 74 is attached to a central portion of the diaphragm 62 within the coils of the spring 70 and the chamber 72 to form a base against which one end of a tapered valve needle 76 is attached. When the brake pedal 58 is not in use, air within the chamber 72 can flow freely through the port 68 under the bracket 74 and escape into the adjacent chamber 60 and out vent port 63. The tapered end portion of the needle 76 extends through a tapered inlet orifice 78 and is disposed in an inlet chamber 80 defined by the housing 53. The needle 76 is normally seated in air tight closing engagement with the orifice 78 when the brake pedal 58 is not in use.

When the brake pedal 58 is depressed to engage the vehicle brakes, the valve 52 is activated wherein the plunger 56 overcomes the combined bias of the spring 70 and the high pressure air introduced through line 50 into the inlet chamber 80, to force the diaphram 62 to disengage the needle 76 from the orifice 78. At the same time the mass 66 on the end of the plunger 56 closes the vent port 68 and isolates the chamber 72 from the chamber 60 in an air tight manner. Air introduced into the chamber 80 flows around the needle 76, through the orifice 78 and into the chamber 72 from which it passes through a pair of outlet ports 84 and 86 into air lines 88 and 90, respectively. Air pressure thus introduced into the lines 88 and 90 is variable and depends upon the force applied by the operator's foot upon the brake pedal 58.

When the brake pedal 58 is released, the combined forces of the spring 70 and high pressure air in the chamber 72 drive the needle 76 back into air tight closing engagement with the orifice 76. At the same time, the brake pedal 58 should be adjusted to spring back to its inoperative position sufficiently to disengage the mass 66 from the vent port 68 so as to permit residual high pressure air in the chamber 72 to escape through the port 68, into the chamber 60 and out the vent port 63, to equalize the air pressure in the chamber 60 and 72 at ambient values.

The pressure control valve 48 is adapted to maintain a relatively constant and low level of air pressure in its output line 54 at all times during which the vehicle brakes and brake control valve 52 are inoperative. The valve 48 may be designed or adjusted to provide any suitable level of air pressure in the line 54 during such quiescent periods, such as for example, 20 psi. Such a quiescent value of pressure in the line 54 will permit the system to respond quickly when needed, particularly where air pressure on the inlet line 46 approaches a maximum value of 60 psi as previously suggested. Of course, these are suggested values only and can be varied substantially depending upon design requirements of the system.

The pressure control valve 48 includes a housing 92 which defines a pair of air chambers 94 and 96 located on either side of a movable diaphragm 98. A spring 100 is confined in the chamber 94 between the diaphragm 98 and an opposing wall of the housing 92. The tension of the spring 100 is preferably adjustable by means of a suitable adjusting screw 101 adapted to tighten or loosen the spring 100 in any well known manner. Compressed air, at a pressure depending upon foot pressure applied to the pedal 58, is conveyed from the brake control valve 52 through the line 88 and into the chamber 94, through a port 102 when the vehicle brakes are activated. A tapered valve needle 104, attached to the diaphragm 98, extends through a tapered valve seat defining an orifice 106 and into an inlet air chamber 108. High pressure air is introduced through the line 46 into the inlet chamber 108 through an inlet port 110. The spring 100 is adjusted to a tension sufficient to allow the needle 104 to permit air to flow through the orifice 106 into the chamber 96 until the desired quiescent pressure level is obtained therein, during periods when the brake control valve 52 is inoperative. When the valve 52 is actuated during vehicle braking, air flows in the line 88 and into the chamber 94, adding to the pressure of the spring 100 against the diaphragm 98 to force the needle 104 further away from the orifice 106. This, in turn, quickly raises the pressure in the chamber 96 to a high value well above the quiescent pressure level. Accordingly, during brake operation, the pressure level at the output port 112 and in the line 54 is considerably greater than when the vehicle brakes are not in use. The magnitude of the pressure level in the line 54 during operation of the brake pedal 58 and valve 52 is a function of the operator's foot pressure.

At the heart of the system is a novel means for sensing or indicating the speed of each of the vehicle wheels 10, 12, 14 and 16, individually, and monitoring the speed of the vehicle as a whole. One preferred embodiment of such means, featuring an efficient, space saving and self-contained assembly 114, together with novel components thereof, is shown in detail in FIGS. 3-9. Several alternative arrangements of such means and the components thereof are shown in other figures as hereinafter explained.

Referring now to FIGS. 1-9, the assembly 114 includes a housing 115 containing a rotatable member or means consisting of a flywheel 116 fixedly mounted to a rotatable shaft 118. The housing 115 is disposed at a convenient and suitable location within the vehicle such as the engine compartment, such that the longitudinal axis of the shaft 118 is level when the vehicle is level and is aligned parallel to the direction of normal straight-forward vehicle movement. The shaft 118 is rotated by means of a train of disengagable gears 120 and 122 disposed on the shaft 118 and an adjacent rotatable shaft 124, respectively.

The shaft 124 is, in turn, driven by means of a conventional flexible speedometer cable 126 connected in the usual and well known manner to either one of the unpowered vehicle wheels 14 or 16. The active or driven gear 122 is adapted to slide longitudinally along the shaft 124 to a position of complete disengagement with the driven gear 120 (upward as viewed in FIG. 3) when the vehicle brake pedal 58 is depressed and the brake pedal control valve 52 is operative. Thus, during periods of vehicle braking, the flywheel 116 and the shaft 118 rotate freely, independent of the rotation of the wheel 14 or 16 which otherwise drives the same.

Disengagement of the gear 122 from the gear 120 during vehicle braking is obtained by means of an air cylinder 128 having a housing 130 defining a cylindrical chamber in which is disposed a movable plate 132. The plate 132 is connected to a plunger rod 134 which projects out of the housing 130 parallel to and beneath the shaft 124. Mounted on the plunger rod 134 is a pair of arms 136 separated by a spacer 138 which extends vertically to confine the gear 122 therebetween. The gear confining ends of the arms 136 may be slotted in the form of a half-circle to conform to the circular periphery of the shaft collars of the gear 122 in close spaced relation thereto. Thus the arms 136 control the translation of the gear 122 along the shaft 124 in response to the movement of the plunger 134. The gear 122 rotates in unison with the shaft 124, regardless of its displacement thereon, by virtue of an elongated key 139 of rectangular cross-section locking the two together. The key 139 should be long enough so that the gear 122 will not slide off the end thereof during its translation along the shaft 124. The plate 132 and the plunger 134 are actuated to disengage the gear 122 upon introduction of high presssure air from the brake pedal control valve 52 through a line 89 into one end of the housing 130. A spring 140 confined between the plate 132 and the other end of the housing 130 provides bias to effect the return of the gear 122 into engagement with the gear 120 when the vehicle brakes are released and the brake pedal control valve 52 is rendered inoperative.

It is anticipated that, under certain unusual conditions following disengagement of the gears 120 and 122, the flywheel 116 may rotate at a speed somewhat different than the speed of the driven gear 122. Should such a condition exist when the vehicle brakes are released, sudden re-engagement of the gears 120 and 122, caused by return of the plunger 134 to its inoperative position, may cause excessive gear wear or damage. Such a result may be avoided by disposing the gear 120 over a collar 142 so that the former will tend to slidably rotate over the latter. A spring 144, coiled about the collar 142 and confined between the gear 120 and the opposing circular face of a second collar 146, permits the gear 120 to slip upon the collar 142 and thereby catch up or slow down relatively gradually to match the speed of the gear 122 upon a sudden gear re-engagement. The spring 144 should be adapted to provide a catch-up time of a few seconds, when necessary, for example 3 or 4 seconds, so as to avoid damage to the gears 120 and 122 under most circumstances. Once the gear 120 matches the speed of the collar 142, the spring 144 causes the gear 120 and collar 142 to rotate together, without slippage between the two. The collar 142 rotates in unison with the shaft 118 at all times due to the presence of a rectangular key 148 which fits within opposing rectangular channels formed along both the shaft 118 and the inside surface of the collar 142 in the usual well-known manner. An example of such keyed rotation is illustrated in FIG. 8 as later explained.

The shaft 118 is disposed within journals 150 and is adapted to slide back and forth therein, in the direction of its longitudinal axis, against a pair of springs 152. When the vehicle brakes are applied so as to produce deceleration, the inertia of the shaft 118 and the flywheel 116 causes the same to translate forward in the housing 115, in the direction of vehicle motion, until the flywheel 116 presses against one of a pair of padded brake plates 154. The plates 154 are fixedly attached to the base of the housing 115 and are preferably padded with conventional brake lining material 156 to absorb the friction produced by the rotation of the flywheel 116 thereagainst. Under these conditions, the shaft 118 slides longitudinally through the collar 142. A flange 158, formed on one end of the collar 142 and an opposing face of the collar 146, confine the free end of an arm 160 therein. The arm 160 is fixedly attached to the housing 115 so as to restrain the collar 142 from translating relative thereto during periods of vehicle acceleration or deceleration. The shaft 118 is thus adapted to slide longitudinally through the collar 142 without disturbing the position of the latter.

The collar 146 is fixedly mounted upon a portion of the collar 142 so that the two always rotate in unison. As seen in FIG. 8, an elongated key 162 of rectangular cross-section may be disposed within opposing rectangular channels formed in the surfaces of the collar 142 and 146 to lock the two together. A series 164 of four novel fluid sensing valves 164a, b, c, and d having a housing 165, containing a concave base 167, are fixedly attached at the top thereof to the housing 115 and adapted to slidably engage the periphery of the collar 146, along the base 167 in close fitting relation therewith.

The valves 164a, b, c and d are employed to continuously sense the rotation of the shaft 118 and flywheel 116 and consequently, the motion of the vehicle as a whole. The information thus obtained is transmitted by means of a fluid signal to a comparing means 216 (FIG. 2) which is operatively associated with the vehicle wheel brakes as later more fully explained. Since the valves 164a, b, c, and d are each of identical construction and operation, only the valve 164a will be explained.

Referring particularly to FIGS. 8 and 9, the valve 164a defines an inlet air chamber 166 and an outlet air chamber 168, both being of similar geometry and, therefore, interchangable in usage. Centered between the chambers 166 and 168 is an air storage or central air chamber 170. The chamber 166, 168 and 170 may be of circular cross-section and each must open onto the concave base 167 of the housing 165 and the periphery of the collar 146 in a line parallel to the plane of rotation of the collar 146. The chamber openings are maintained in essentially air tight engagement with the collar 146 by means of a spring 172 confined between the top of the housing 115 and a flat upper surface of the valve housing 165. Though not essential, it may be found desirable to make the capacity of the air chamber 170 adjustable, which can be accomplished by means of an adjustable screw 174 accessible through an opening 176 in the housing 115.

The periphery of the rotatable collar 146 contains at least one recess or slot 178, preferably of circular cross-section, disposed, so as to rotate into engagement with each of the chambers 166, 170 and 168 in a sequential manner. The collar 146 of FIG. 8 contains four such slots 178, but any desired number may be employed, within practical design limits of course.

In typical operation, the valve 164a and the collar 146 function as follows. Compressed air is introduced into the inlet chamber 166 through the top thereof from a suitable source. The pressure therein remains static until one of the slots 178 rotates past the opening in the bottom end of the chamber 166. The slot 178 will rotate to a point wherein, for a brief time during each cycle of rotation of the collar 146, the chambers 166 and 170 communicate through it. The slot 178 must have sufficient diameter of span across the wall 180 separating the chamber 166 and 170. At this point in time, compressed air is transmitted from the chamber 166, through the slot 178 into the central chamber 170.

As the slot 178 continues its movement, it crosses the wall 182 and causes a pulse of compressed air to pass from the chamber 170 therethrough and into the outlet chamber 168. The faster the collar 146 rotates, the greater will be the volume of compressed air passed from the inlet chamber 166 through the central chamber 170 and into the outlet chamber 168 in a given amount of time, and consequently, the greater will be the average air pressure supplied by the outlet chamber 168 to the rest of the brake control system. Accordingly, the valve 164a and the collar 146 operate so as to deliver compressed air to the outlet chamber 168 whose pressure is a function of the speed of rotation of the collar 146. However, since the air pressure delivered to the inlet chamber 168 through the line 166 (FIG. 2) varies depending upon foot pressure applied to the brake pedal 58, the air pressure transmitted to the outlet chamber 168 will not be directly proportional to the speed of the vehicle as indicated by the flywheel 116 (FIGS. 3-6). Nevertheless, as long as the air pressure supplied to both the vehicle speed sensing valves 164 and the associated wheel speed sensing valves is supplied from the same source, as for example, through the line 54, or from identical sources the comparing means 216 (FIG. 2) will generate a response substantially proportional to the actual difference in the speeds of the vehicle wheel and vehicle as a whole, which is all that is necessary for proper vehicle brake control operation. In other words, the vehicle and wheel speed sensors may, but do not necessarily have to sense the true speeds of the vehicle and wheels for satisfactory operation of the system of the instant invention. The housing 165 is preferably constructed of a suitable lightweight and durable material which will not tend to wear easily as a result of the rotation of the collar 146 against the base 167. A suitable teflon impregnated plastic such as is widely available is recommended. Although many other suitable and well known materials may be used.

Inlet air to supply the valves 164a, b, c and d is introduced into the chamber 166 of each from the line 54 and valve 48. Outlet air, from the outlet chambers 168 of each valve is transmitted to a comparing means 216 operatively associated with each of the vehicle wheel brake assemblies. As suggested schematically in FIG. 2, the valves 164a, b, c and d can be disposed radially around the collar 146 in the same vertical plane as an alternative to the tandem or in-line arrangement shown in FIG. 8, if desired. Such a radial arrangement requires only one slot 178 to operate all four of the valves in the combination 164. Also, such a radial arrangement takes up less length of the shaft 118, which may be advantageous where a shorter housing 115 is needed for use in small spaces. However, since the screws 174 would be radially displaced from one another around the collar 146 in the radial arrangement of FIG. 2, adjustment thereof may prove to be more difficult than where the valves 164 are disposed parallel to one another in the tandem or in-line arrangement of FIG. 8.

When the vehicle brakes are applied to the pedal 58 to produce deceleration of the vehicle, the flywheel 116 and shaft 118 combination tend to translate forward in the housing 115, relative to the front of the vehicle, such that the flywheel 116 presses against the brake pad 156. The force of the flywheel 116 pressing against the pad 156 is approximately directly proportional to the rate of deceleration of the vehicle.

Since the friction thus applied to the now freely rotating flywheel 116 slows the rotational speed thereof at a rate directly proportional to the pressure of the flywheel 116 against the pad 156, the speed of the flywheel 116 at any given time during the vehicle braking operation is approximately directly proportional to the speed of the vehicle speed during this period. Since the valves 164a, b, c and d are adapted to sense such deceleration, four vehicle speed reference signals are thereby generated which can be used in the brake control process to limit skidding or spinning of each of the wheels 10, 12, 14 and 16. Of course, during periods when the brakes are not in use, the flywheel 116, shaft 118 and collar 146 are directly driven at the speed of the vehicle through the gears 120 and 122, as previously explained. Thus the valve combination 164 provides a series of signals at all times during vehicle movement which are dependent upon vehicle speed and the air pressure in the line 54.

The speed of each of the wheels 10, 12, 14 and 16 is continuously and individually monitored by means of four fluid sensing valves 188, 194, 192 and 190, respectively. These wheel speed sensing valves are each constructed in the same manner as the valve 164a as previously explained, and are disposed in slidable engagement upon collars 196, 202, 200 and 198, each containing a slot 203, the same as the slots 178 on the collar 146 of the vehicle speed sensing means. These collars are, in turn, fixedly attached to rotatable shafts 204, 208, 206 and 124, respectively. The shafts are driven by the wheels 10, 12, 14 and 16, respectively, by means of speedometer cables 210, 214, 212 and 126, respectively, all in the usual and well known manner. Note that the wheel speed sensing valve 190 is operated by the same shaft 124 which drives the collar 146 of the vehicle speed sensing valve combination 164.

The outlet channels 168a, b, c and d of the vehicle speed sensing valve combination 164 are connected by air lines, designated by the same numbers in FIG. 2, to the vehicle and wheel speed comparing means 216 which is operatively associated with the vehicle brakes 11 and 13 of FIG. 1.

Referring now to FIGS. 1 and 2 showing, schematically, the comparing means 216 and FIGS. 10–12 and 14 showing one preferred structural embodiment thereof, there is shown a housing 217 consisting of a sub-assembly 217a which contains the comparing means 216 and a sub-assembly 217b which contains a hydraulic brake master cylinder for control of the vehicle brakes 11 and 13 in the usual well known manner. The housing 217 thus contains an efficient and compact assembly for hydraulic brake operation in conjunction with the fluid operated skid and spin control system of the instant invention.

The housing 217a contains a series of four fluid operated two-way cylinders 218a, b, c and d, each of which is operatively associated with the brakes 11 and 13 of a different vehicle wheel. Since each of the cylinders 218a, b, c and d is of identical construction and operation, only the cylinder 218a will be described, which consists of a cylinder 220 defining a relatively large cylindrical air chamber 222 in which is slidably disposed a relatively large diameter disc 224 fixedly mounted or formed on a shaft 226. The shaft 226 is adapted to translate back and forth within the housing 217 along its longitudinal axis in response to the application of the vehicle brakes at the brake pedal 58 and operation of the anti-skid and anti-spin features of the system of the instant invention. An O-ring 228 of the usual well known type is confined about a central portion of the periphery of the disc 224 to provide a substantially air tight seal between the disc 224 and the cylindrical defining wall of the chamber 222. The disc 224 translates back and forth within the chamber 222 with the movement of the shaft 226 between two air inlet channels 230 and 232 which communicate with the chamber 222 on opposite end portions thereof.

Operating in series or tandem with the cylinder 220 is a second cylinder 234 consisting of a relatively small diameter cylindrical air chamber 236 in which is disposed a relatively small diameter disc 238 fixedly attached to the shaft 226. An O-ring 239 is disposed around the periphery of the disc 238 to provide an air tight seal between the latter and the cylindrical defining wall of the chamber 236. The disc 238 is adapted to slide back and forth within the chamber 236 with the movement of the shaft 226. Compressed air to operate the cylinder 234 is introduced into the chamber 236 through an air inlet channel 240. The cylinder 234 applies the vehicle brakes to the wheel 10 by means of air introduced therein by operation of the brake control valve 52 under normal braking conditions which do not approach locking or skidding of the wheel 10. The pressure of the air introduced thereto via the line 90 and a branch line 90a is variable, depending upon the foot pressure applied to the brake pedal 58.

On the opposite side of the disc 224 from the disc 238 and beyond the end of the chamber 222, the shaft 226 projects out of the sub-assembly 217a and into a relatively small diameter chamber 242 in the master cylinder sub-assembly 217b. A relatively small diameter disc 244 is slidably disposed in the chamber 242 and fixedly attached to the shaft 226. An O-ring 246 is confined around a central portion of the periphery of the disc 244 to form a substantially air tight seal between the latter and the cylindrical defining wall of the chamber 242. The disc 244 is adapted to slide along the chamber 242 with the movement of the shaft 226 during loading or unloading of the vehicle brakes on the wheel 10. The purpose of the disc 244 is to provide a barrier to separate high pressure air in the chamber 222 and hydraulic fluid of the usual type used in the vehicle brakes assembly 217b. A hydraulic brake cylinder 248 is thus formed in the sub-assembly 217b on the opposite side of the disc 244 from the chamber 222.

A tapered rubber cup 250 is disposed about an end portion of the shaft 226 within the chamber 242 and is secured within a notch 252 formed in the shaft 226 so as to prevent the cup 250 from sliding back and forth upon the shaft 226 during movement of the latter. The cup 250 forms a substantially liquid and air tight seal with the cylindrical defining wall of the chamber 242. A reservoir 254 is formed in the sub-assembly 217b above the cylinder 248 to store excess hydraulic fluid. The reservoir 254 communicates with that portion of the chamber 242 on the vehicle brake side of the cup 250 to allow hydraulic brake fluid to fill a line 258 leading to the brakes on the wheel 10 when those wheel brakes are not applied. Upon application of the brakes of the wheel 16, the shaft 226 and cup 250 translate through the chamber 242 causing the flow of hydraulic fluid from the reservoir 254 through the channel 256 to the vehicle brakes of the wheel 10 to be interrupted, thereby eliminating back pressure on the reservoir 254 which would otherwise occur during the braking operation.

A tapered end 260 of the shaft 226 fits into one end of a coiled spring 262 which compresses to allow the shaft 226 to translate so as to apply hydraulic fluid to the vehicle brakes. A removable lid 263 confines hydraulic fluid in the reserovir 254 and permits refilling thereof from time to time as necessary. A spring 265 holds the lid 263 securely in place. Three partition plates 267 separate hydraulic fluid for each wheel brake of the vehicle, so that loss of hydraulic fluid to one wheel brake will not cause the loss of duch hydraulic fluid to the brakes of the remaining vehicle wheels.

High pressure air which has been built up in the chamber 222 on either side of the disc 224 is bled out of the housing 217 through a pair of bleeder valves 264. The valves 264 may be of any suitable well known adjustable type if desired to permit preselection of the rate of venting of air from the chamber 222 if desired. In the alternative, a pair of very small channels 266 and 268 may be employed without the adjustable bleeder valves 264 to provide means for air on either side of the disc 224 to escape the chamber 222 so that the disc 224 and shaft 226 can be moved along the chamber 222 to load or unload the brakes to limit spinning or skidding of the wheel 10. For example, without the bleeder channel 268, air pressure introduced through the line 261 into the right side of the chamber 222 (as viewed in FIG. 12) to load the vehicle brakes and retard a spin condition, might not overcome the air pressure previously built up on the opposite side of the disc 224 sufficiently to allow such loading of the brakes on the spinning wheel with satisfactory response. And, if the wheel 10 is locked, it ordinarily will not permit a reverse flow of air back through the channel 232 to the wheel valve 188 and collar 196 because they are also then locked. The bleeder valves 264 insure that under all such conditions, a pressure differential can be built up rapidly across the disc 224 to permit movement thereof to load or unload the wheel brakes as necessary. The cross-sectional area of the disc 224 should preferably be at least twice as large as the cross-sectional areas of the disc 238 and 244 so that a net positive air pressure on either side of the disc 224 will cause the disc 224 to translate in the cylinder 220 and overcome any opposition to such movement caused by the same air pressure operating against the smaller discs 238 and 244. By adjusting the area of the disc 224 relative to the area of the discs 238 and 244, the cylinder 220 can be made to operate the vehicle brakes at various net pressure differences across the disc 224, from very large pressure differentials to very small pressure differentials as desired.

Now regarding the fluid operated brake control system of the present example as just described, it may be found preferable to add a high pressure by-pass circuit 540 thereto to increase the response of the vehicle brakes to certain conditions which tend to bring about spinning of the power driven vehicle wheels 14 and 16. Suppose that the vehicle is proceeding along a roadway at a fairly moderate speed, such as 20 or 30 mph, for example, at which time the driver desires to accelerate the vehicle rapidly. Suppose further that the roadway conditions are extremely slick as when covered with ice, for example. Such a condition is conceivable, where the driver is in the act of passing another vehicle on a two-way roadway and finds suddenly that he has misjudged his distance from an approaching automobile. If he is fully committed to pass the other vehicle, he may panic and press the vehicle accelerator heavily in an attempt to complete the act of passing. Under such conditions, the driven wheels 14 and 16 will react quickly to the attempt to accelerate and may begin to spin rapidly on the icy road surface. While the system will react to the increase in the speed of the driven wheels 14 and 16 over the speed of the vehicle as a whole, the reaction may be unsatisfactorily slow or insufficient to apply the full braking force required. This is so because the power driven wheel speed sensors 192 and 190 and the vehicle speed sensor 164 must react while having only relatively low pressure air, i.e. approximately 20 psi, supplied to their inlet chambers 166 from the line 54. Note again that under wheel spin conditions produced by attempted vehicle acceleration, the brake pedal 58 and brake pedal control valve 52 are not operative so that relatively high pressure air, i.e. approximately 60 psi, is not introduced into the line 54 to operate the sensors, as is the case when the brake pedal 58 is operated and the system responds to limit a skid condition.

Accordingly, to enhance system response to such spin conditions wherein the brake pedal control valve 52 is inoperative, the high pressure by-pass circuit 540 may be employed and connected between the reservoir 22 and the input chambers 166 of the sensors 164, 190 and 192. I recommend connecting the circuit 540 between the high pressure line 46 and the line 54 as indicated at branches 54a and 46a in FIG. 2. The circuit 540 includes a spool valve 542 of the usual and well known type actuated by an electrical solenoid 544, also of well known type.

The valve 542 consists of a housing 546 defining a cylindrical hollow chamber 548 in which is disposed a linearly movable member 550 containing a pair of spaced circular plates 552 and 554. The plates 552 and 554 are adapted to slidably engage the chamber defining wall of the housing 546 in an air tight manner and may employ the usual O-ring seals for that purpose. A third plate 556 of the same construction as the plates 552 and 554 is attached to one end of the member 550 to act as a barrier to isolate the chamber 548 from a vent port 558. The other end of the member 550 projects through the other end of the housing 546, through an air leakable hole, and into the solenoid 544. High pressure air is introduced from the branch line 46a, through an inlet port 560 and into the chamber 548. High pressure air exits the chamber 548 through an outlet port 562 which is displaced along the longitudinal axis of the housing 546 from the position of the inlet port 560.

The solenoid 544 is responsively connected, electrically, by means of a lead wire 564 to four hydraulically operated switches 566, connected in parallel with one another between the vehicle brake lights 568 and the vehicle electrical power source or vehicle battery 570. The switches 566 are of conventional type which are often found on modern vehicles, each of which is responsively connected to the hydraulic brake assembly of a different one of the vehicle wheels 10–16.

Now, when any one of the brakes of the vehicle becomes operative for any reason, either as a result of operation of the pedal 58 or as a result of automatic brake loading by any one or more of the cylinders 220 of the comparing means 216, the solenoid 544 is activated by the same circuit that activates the vehicle brake lights 568. As a consequence, the solenoid 544 draws the member 550 to the left across the chamber 548, as viewed in FIG. 2, such that the plate 554 slides across and past the inlet orifice 560. The orifice 560 then communicates directly with the outlet orifice 562 between the plates 554 and 556, such that high pressure air from the line 46 by-passes the valve 48 and is introduced directly into the line 54. Such high pressure air is then available to operate the vehicle and wheel speed sensors 164 and 188–194 under vehicle wheel spin conditions, the same as when the valve 52 is active under vehicle wheel skid conditions. Automatic brake loading and response, for limiting wheel spin conditions, should thereby be improved using the circuit 540 under such conditions as above described. When the brakes of all the wheels 10–16 disengage, all of the switches 566 open to turn off the vehicle brake lights in the usual manner. At the same time, the solenoid 544 is deactivated so a spring 541 can force the member 550 back to the right of the chamber 548, as viewed in FIG. 2, such that the plates 552 and 554 are disposed on either side of the inlet port 560. Accordingly, the ports 560 and 562 become isolated from one another on opposite sides of the plate 554 and high pressure air flow between the lines 46a and 54a ceases.

The circuit 540 will not be required where only the anti-skid feature of the system is employed. Moreover, it may not be needed in the anti-spin mode except under unusual conditions where rapid and significant vehicle brake response is required. It should be noted that even where low pressure air is used to actuate the cylinders 220 to load the brakes, some braking will occur relatively rapidly even without the use of the circuit 540, certainly enough to actuate the switches 566 to operate the vehicle brake lights 568. However, the light braking force thus generated may be small for effective anti-spin protection. Thus, the brake light circuit can be employed to actuate the by-pass circiit 540 to provide high pressure air for effective anti-spin protection if desired.

It should be noted here that one particular advantage of the fluid operated system of this example is that only relatively low pressure air is used to maintain the same in a readiness status during normal periods of vehicle operation when neither the anti-skid or anti-spin features of the system are operative. Thus, the vehicle fluid source, such as the compressor 18 and the reservoir 20 are not continuously required to meet a demand of the system for great volumes of high pressure air at all times during vehicle operation, rather only during those brief periods when the system must operate. Those skilled in the art will recognize that the solenoid 544 may, in the alternative, be actuated by means of a suitable switch connected so as to respond to a difference in pressure between the fluid signals generated by the vehicle speed sensors 164a and 164b and the wheel speed sensors 188 and 194, rather than by the hydraulic brake operated switches 566.

Figure 14:
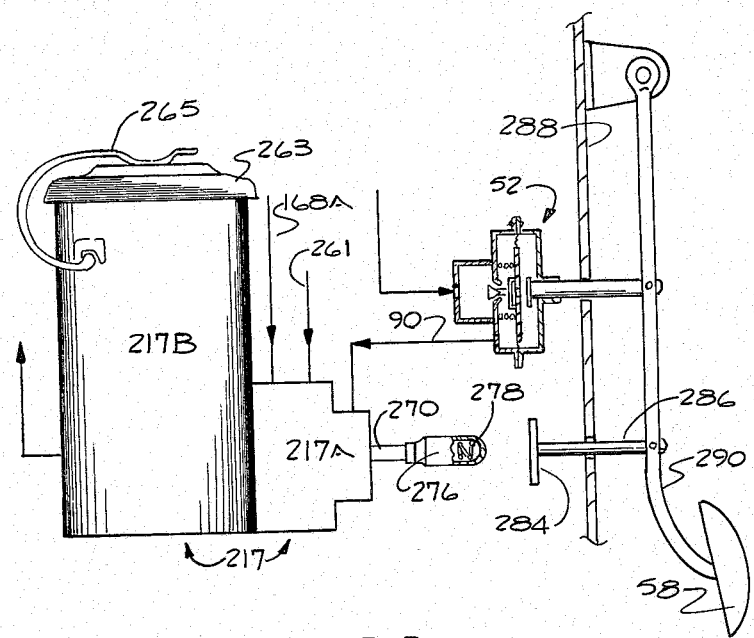
FIG. 14 shows a side elevation view of a mechanical manual brake override assembly used in association with the comparing means and master cylinder assembly of FIGS. 10-12, thus illustrating another preferred embodiment of the subject invention.

An additional and optional feature which is adaptable to the assembly contained in the housing 217, is a manual override feature which may be employed if desired to insure the application of vehicle brakes by ordinary mechanical means in the event of an air leak or sudden failure of the fluid operated brake control system. If for example, the branch line 90a should rupture for any reason such as age, wear or damage, then brakes could not be applied to the wheel 10 in the manner as previously described. To avoid such a condition, an end portion 270 of the shaft 226 extends through an air tight seal 272 and projects outside of the housing 217a. A rounded end 274 of the shaft 226 fits within a cap 276 against a coiled spring 278. There are a series of four such caps 276a, b, c and d extending out of the assembly 217a, each being operatively associated with a different one of the wheel brakes as seen in FIG. 11 particularly. The caps 276a, b, c and d are disposed in registry with a plate 284. As seen in FIG. 14, the plate 284, in turn, is attached to a shaft 286 which extends through a vehicle fire wall 288 to pivotally connect to a pivotal brake pedal shaft 290.

Now, should the fluid operated brake control system of the instant invention fail for any reason, such as by rupture of the branch line 90a, the plate 284 will move the cap 276 and compress the spring 278 against the enlarged end 274 of the shaft 226 and force the same through the housing 217 to apply hydraulic brake fluid, under pressure, to the brake at the wheel 10 in a purely mechanical manner as opposed to the normal air pressure operation. The forward thrust of the plate 284 should be limited such that a great foot pressure applied to the pedal 58 will not cause the caps 276 to apply a braking force to the vehicle wheels and cause skidding thereof during normal anti-skid operation of the brake control system of the invention. The spring 278 should be strong enough to apply mechanical braking force when the system fails, but light enough to allow air introduced through the line 168a into the chamber 222 to compress the spring 278 and move the shaft 226 back into the cap 276 to unload the brakes on the wheel 10 should the wheel 10 approach a skid condition even with the vehicle brake pedal being depressed with full force as in an attempted panic stop. There should still be enough compressive travel remaining in the spring 278 to allow air pressure operation of the cylinder 220 to force the end 274 of the shaft 226 further into the cap 276 so that the vehicle brakes on the wheel 10 can be unloaded to limit the tendency of the wheel 10 to lock or skid.

Referring now to FIG. 15 there is shown an alternative rotating means 294 which may be substituted into the system of the instant invention in place of the flywheel 116, as previously described and shown in FIGS. 3–6. The means 294 includes a freely rotatable wheel 296, which may be an inflatable tire of small diameter in comparison with the ordinary sized vehicle wheels 10, 12, 14 and 16. The wheel 296 is rotatably mounted to a yoke 298, which yoke is, in turn, pivotally connected to a portion 300 of the vehicle frame by means of a pivot pin 302. The yoke 298 is biased to hold the wheel 296 against the roadway upon which the vehicle travels by means of a spring-shock absorber combination 304 connected between the shaft of the yoke 298 and the frame 300. A conventional speedometer sensor 306 is inserted into a central axial portion of the wheel 296 in the usual well-known manner to sense the speed of rotation thereof upon the roadway. A flexible speedometer cable 308 conveys wheel speed information to drive a rotatable shaft and collar associated with four vehicle speed sensing valves of the same type and construction as those previously described in relation to FIGS. 3–5, namely the shaft 118, collar 146 and valves 164, respectively.

The flywheel 116 of FIG. 3 is thus eliminated by the means 294 of FIG. 15. Also, the means 294 eliminates the need for the train of gears 120 and 122 of FIGS. 3 and 4 which is required in driving the shaft 118 and flywheel 116. The cable 308 of the means 294 drives the shaft 118 directly since there is no need to interrupt the powered drive to the shaft 118 when using the wheel 296 as is necessary when using the flywheel 116 of FIGS. 3–6 as previously explained.

Figure 13:
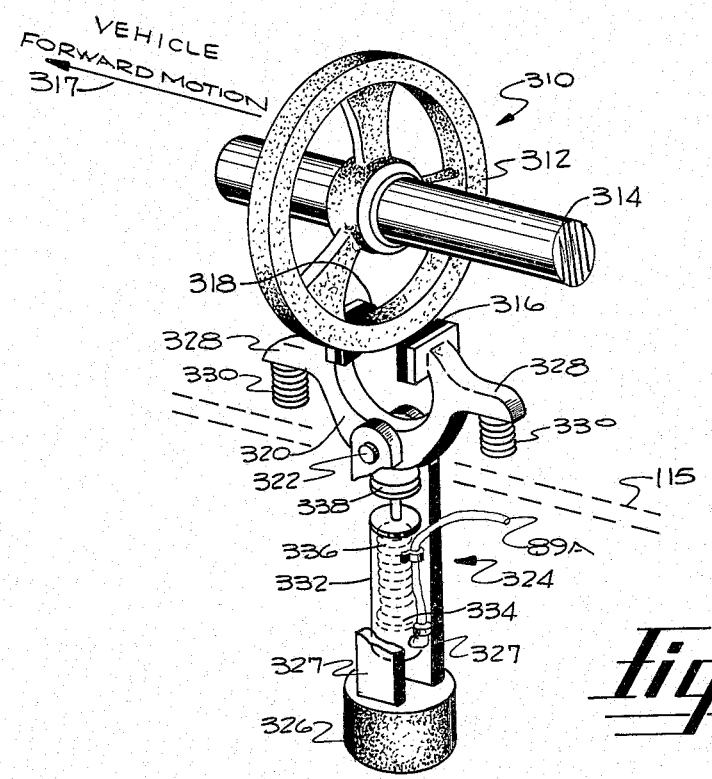
FIG. 13 shows an oblique projection of a flywheel assembly illustrating yet another preferred embodiment of the subject invention.

Referring now to FIG. 13, there is shown a vehicle speed indicating means 310 which is an alternative of the combination of the translatable flywheel 116 and shaft 118 and fixed brake plate 154 as previously described in relation to the structure shown in FIGS. 3–6. The means 310 of the present example includes a flywheel 312 fixedly mounted on a rotatable shaft 314, the combination of which is adapted for disposition in the housing 115 of FIG. 3 in place of the flywheel 116 and shaft 118 with the ends of the shaft 314 confined within the journals 150 (FIG. 3) in a non-translatable manner. The springs 152 of FIG. 3 would be removed and the ends of the shaft 314 would extend to the ends of the journals 150 so that no translation of the flywheel 312 and shaft 314 could occur therein.

Instead of the fixed brake plates 154 attached to the housing 115 as is the case in the structure of FIGS. 3–6, the assembly of FIG. 13 employs a pair of brake pads 316 and 318 disposed on either side of the flywheel 312 which are pivotally attached by means of a circular yoke 320 to a pivot pin 322. A pendulum assembly 324 is also attached to the pin 322 and is suspended in a free swinging manner through an opening in the floor of the housing 115. A mass 326 attached on the bottom of a pair of arms 327 tends to maintain the assembly 324 plumb regardless of the inclination of the vehicle on roadways when the vehicle brakes are not in use. A pair of arms 328 extend from either side of the yoke 320 and operate against a pair of springs 330 attached to the housing 115 to keep the brake pads 316 and 318 away from the flywheel 312 until braking is applied. The springs 330 bear no substantial weight since the pivot pin 322 supports the assembly and is fixedly attached to the sidewalls of the housing 115.

An air cylinder 332 is disposed between the arms 327, having a slidable disc 334 therein adapted to slide upward upon application of compressed air to the bottom of the cylinder 332 through a branch air line 89a communicating with the line 89 (see FIG. 2). The disc 334 is returnable to the bottom of the cylinder 332 when compressed air in the line 89a is interrupted, due to bias caused by a spring 336 disposed between the top end of the cylinder 332 and the disc 334. A plunger 338, preferably containing a compressible resilient padding, such as rubber or the like is attached to a rod which extends into the cylinder 332 and attaches to the disc 334.

In typical operation of the means 310, the pendulum assembly 324 maintains a plumb position at all times relative to the earth, regardless of the inclination of the vehicle, during periods when the vehicle brakes are not in use. The pads 316 and 318 are maintained parallel with relatively equal spacing on either side of the rotating flywheel 312 during such periods. Now assume that the vehicle is in motion along a steep downhill grade while traveling in the direction of the arrow 317 in FIG. 13. The mass 326 on the end of the arms 327 will cause the pendulum assembly 324 to rotate clockwise about the pin 322 to maintain a plumb position relative to the earth. If vehicle brakes are applied under these conditions, air from the brake pedal valve 52 (FIG. 2) will flow into the bottom of the cylinder 332 through the line 89a and force the disc 334 upward against the spring 336 until the plunger 338 engages the circular periphery of the yoke 320. The pendulum assembly 324 and the yoke 320 are thus locked in a fixed angular relationship to one another. As the vehicle begins to decelerate due to braking, the mass 326 rotates further clockwise due to its inertia thus forcing the yoke 320 to rotate clockwise about the pin 322 until the pad 318 engages the side of the rotating flywheel 312. The force with which the pad 318 presses against the flywheel 312 is proportional to the rate of deceleration of the vehicle during the braking operation, just as in the previous example wherein the flywheel 116 translated against the stationary brake plate 154 as indicated in FIGS. 3–6. In the present example, however, the pendulum assembly 324 substantially eliminates error created by the added force of gravity which might occur when the vehicle, using the assembly of FIGS. 3–6, is decelerating along a significant grade or incline. There the force of gravity would tend to aid the inertial force in sliding the flywheel 116 into the stationary brake plate 154 whereas the inertial force would be the only force present if the vehicle were decelerated on level ground. Here, in the present example, only the inertial forces are significant in causing the pads 316 and 318 to press against the rotating flywheel 312 and additional forces due to gravity caused by vehicle deceleration on steep inclines are substantially eliminated.

Figure 16:
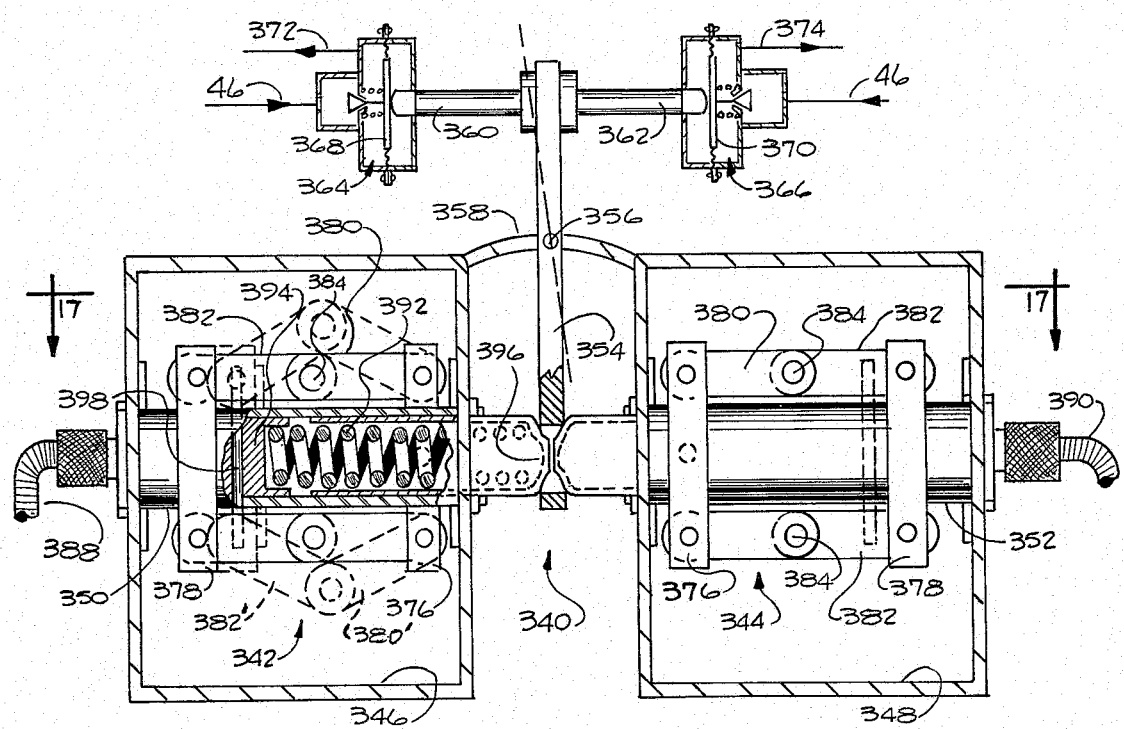
FIGS. 16 and 17 show cross-sectional views in elevation and plan, respectively, of a centrifugal force assembly for comparing vehicle speed with vehicle wheel speed, illustrating another preferred embodiment of the subject invention.
Figure 17:
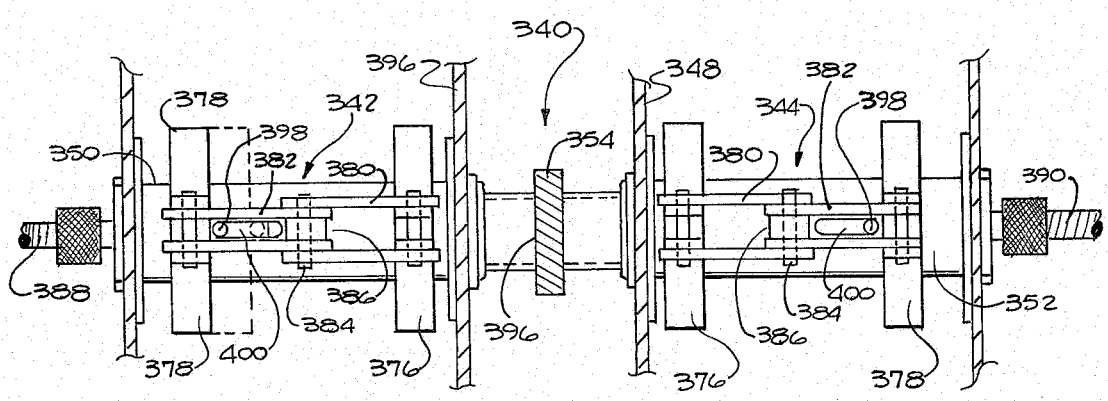

Referring now to FIGS. 16 and 17 there is shown a centrifugally actuatable assembly 340 adapted to continuously sense the speed of a vehicle and one of the vehicle wheels, compare the same, and generate fluid signals for loading and unloading the brakes applicable to said wheel to prevent spinning or skidding thereof. A combination of four such assemblies may be employed in the system of the instant invention as shown in FIG. 2 in place of the fluid operated vehicle speed sensing valves 164a, b, c and d and the fluid operated wheel speed sensing valves 188, 190, 192 and 194.

The assembly 340 includes a pair of counterpoised rotating means or centrifugal force units 342 and 344 disposed within a pair of housings 346 and 348, respectively, and mounted on rotatable shafts 350 and 352. The shafts 350 and 352 are aligned end to end and meet one another through a hole located through one end portion of a pivot arm 354. A central part of the arm 354 is pivotally attached to a pin 356 disposed through a frame member 358 which rigidly joins the housings 346 and 348 together. A pair of plunger rods 360 and 362 are attached to opposite sides of the other end of the arm 354 and project outward therefrom in the plane of rotation of the arm 354 and into a pair of spring loaded fluid valves 364 and 366 of the same type as the brake control valve 52 of FIG. 2 as previously described. The rods 360 and 362 are adapted to press against flexible diaphrams 368 and 370, respectively, to actuate the valves 364 and 366 to produce fluid output signals at the outlet ports 372 and 374 thereof. The ports 372 and 374 should be connected by means of air lines, not shown, to the air inlet channels 230 and 232 of the comparing means 216 of FIG. 12 to provide anti-skid and anti-spin control for the vehicle brakes associated with one of the vehicle wheels.

The units 342 and 344 are each of identical constructions and operation so that only one unit need be explained in detail. The unit 342 includes a circular collar 376 fixedly mounted on the shaft 350, so as to be rotatable with the latter, and a circular collar 378 slidably mounted on the shaft 350. The collars 376 and 378 are joined by means of two sets of double arms 380 and 382, hingable mid-way between the collars 376 and 378 by means of pins 384. A weighted spacer 386 separating the double arms 380 and 382 provides mass tending to bow the arms 380 and 382 outward from the shafts 350 and 352 by an amount depending upon the speed of rotation of the units 342 and 344. The shaft 350 may be driven to rotate by means of a flexible speedometer cable 388 attached either to the wheel 296 of FIG. 15 or the flywheel shaft 118 of FIGS. 3–6, depending upon which type of vehicle speed sensor is employed. The shaft 352 is driven by a speedometer cable 390 attached to one of the vehicle wheels.

The centers of the shafts 350 and 352 are hollow and contain a coiled spring 392 confined between a pair of end sections 394 and 396. The end section 394 is slidably inserted in the end of the shaft 350 and joined to the same by a pin 398. The pin 398 is disposed in an elongated slot 400 which extends through the defining walls of the hollow shaft 350 and the end section 394. As the speed of rotation of the shaft 350 increases as a result of increased driving speed of the cable 388, the weighted spacers 386 are thrown outward away from the shaft 350 by increased centrifugal force, thus hinging the arms 380 and 382 outward as shown by dashed lines 380' and 382' in FIG. 16. As the arms 380 and 382 bend, the collar 378 is drawn along the shaft 350 toward the collar 376, forcing the slidable pin 398 and end section 394 to compress against the spring 392.

As long as the speed of rotation of the units 342 and 344 are equal, meaning that the vehicle and the wheel being sensed are traveling at the same speed, the arms 380 and 382 on both of the units 342 and 344 bend by the same amount, the collars 378 of both units compress the springs 392 by the same amount and, therefore, the opposing forces applied by the shafts 350 and 352 against the pivot arm 354 are equal. The resultant force applied against the arm 354 is zero so that it cannot pivot about the pin 356 and, therefore, both valves 364 and 366 are in an inoperative state, whereby no output signals appear at the ports 372 and 374.

Now, if as in applying brakes to the vehicle, the vehicle wheel by which the unit 344 is driven, approaches a skid condition by rotating significantly slower than the vehicle as a whole, as compared to the speed of rotation of the unit 342, the shaft 350 will press with more force against the arm 354 than will the slower rotation shaft 352, causing the arm 354 to pivot counterclockwise about the pin 356 to actuate the valve 364. Assuming the outlet port 372 is correctly connected to the air inlet channel 230 of the comparing means of FIG. 12, the fluid signal generated by the valve 364 will translate the shaft 226 of FIG. 12 to the right to unload the vehicle wheel brakes and prevent the onset of a skid condition.

Conversely, if the unit 344 rotates at a greater speed than the unit 342, indicating the approach of a wheel spin condition, as when such a wheel is power driven to produce great acceleration of the vehicle, the shaft 352 will press against the arm 354 with greater force then the shaft 350, causing the arm to rotate clockwise about the pin 356 and actuate the valve 366 to generate a fluid signal at the port 374. Assuming that the port 374 is correctly connected by an air line to the air inlet channel 232 of the comparing means of FIG. 12, the shaft 226 will translate toward the left to apply brakes to the vehicle wheel to prevent the onset of a spin condition thereof. Compressed air to operate the valves 364 and 366 can be introduced therein by a line connected to the outlet port 112 of the pressure control valve 48 of FIG. 2. The valves 364 and 366 can be replaced with a single spool valve attached to an air supply and the outlet lines 372 and 374. The arm 354 would also be attached to the spool valve so that it would actuate the spool valve when the arm 354 pivots about the pin 356. Using four assemblies identical to the assembly 340 of the present example in the system of FIG. 2, the various collars 196, 198, 200, 202 and 146, and their associated fluid sensing valves 188, 190, 192, 194 and the valve combination 164 are eliminated. The driving shafts 204, 206 and 208 are also not used. The shaft 124 is still required because of the need for the disengagable train of gears 120 and 122 of FIGS. 3-5, assuming the flywheel 116 is used in conjunction with the assembly 340 of the present example.

Those skilled in the art will appreciate that the collars 196, 198, 200, 202 and their associated valves 188, 190, 192 and 194 used to sense the speed of the various vehicle wheels, need not be packaged in a single self-contained housing 115 such as shown in FIG. 3. In the alternative, each of the collar and valve combinations can be mounted directly upon the rotating axle of the wheel with which each is associated. In the event, the flexible speedometer cables 210, 212 and 214 connected to all of the wheels but the one which powers the shaft 124 can be eliminated. However, because of the disposition of such valve and collar combinations at various locations around the vehicle, input and output air lines connected between the various valves and the comparing means 216 will be longer and will vary in length, disadvantages avoided by using the self-contained assembly 114 of FIGS. 3-6 located conveniently near the comparing means 216.

Referring now to FIG. 18, a vacuum operated automatic brake control system is shown which includes a pressure vessel or vacuum reservoir 410 connected through a one-way air check valve 412 to an air intake manifold 414 of a vehicle, not shown. A partial vacuum or negative pressure, relative to atmosphere, is thus maintained in the reservoir 410. The reservoir 410 is connected by means of an air line 416 to a vacuum brake pedal control valve 418, and by means of an air line 420 to a negative pressure control valve 422.

The valve 418 contains a plunger rod 424, one end of which projects through a wall of valve housing 426 and attaches to one end of a pivotally operated vehicle brake pedal arm 428. The other end of the rod 424 projects through a hole 430 in a movable diaphragm 432. The diaphram 432 attaches to the interior wall of the housing 426 by means of a resilient expandsible material 434, such as rubber or the like, thus forming two vacuum chambers 436 and 438. On the end of the rod 424 which projects into the chamber 436, there is disposed a plate containing a compressible resilient material 440 facing the diaphragm 432 in registry with the hole 430. The material 440 is sufficiently large in diameter to seal the hole 430 in an air tight manner when the rod 424 is drawn away from the valve 418 so as to bring the material 440 into engagement with the diaphragm 432. When the position of the rod 424 is such that the material 440 is spaced from the diaphragm 432, the hole 430 allows the chamber 438 to communicate with the chamber 436 around the rod 424.

A U-shaped mounting bracket 442 is attached over the material 440 to the diaphragm 432 within the chamber 436. A tapered valve needle 444 is attached to the bracket 442 and is disposed in the chamber 436 in registry with a tapered orifice which communicates with an outlet chamber 446. A coiled spring 448 is disposed in the chamber 438 around the rod 424 and confined between the diaphragm 432 and the opposing wall of the housing 426. The brake pedal arm 428 is pivotally attached to a vehicle firewall 450 by means of a pin 452. A vehicle brake pedal 454 is attached to the end of the arm 428 opposite the rod 424.

An air line 456 attaches from the valve 422 to the chamber 436 of the valve 418. Also, an air line 458 attaches to the chamber 436 so as to draw a vacuum upon a chamber 460 defined by a cylinder 462. A plunger rod 464 is attached to an end portion of the arm 428 upon which the pedal 454 is attached, and projects through the firewall 450 in registry with a plunger 466. The plunger 466, in turn, projects through the cylinder housing 462 and attaches to one face of a movable plate 468. A shaft 470 attaches at one end to the other face of the plate 468 and projects out of the housing 462 and into a chamber 472 of a two-way vacuum cylinder 474.

The valve 422 defines two vacuum chambers 476 and 478 divided by a movable diaphragm 480 attached to the interior wall of the valve 422 in the usual air tight manner. A tapered valve needle 482 is attached to the diaphragm 480 and is disposed in the chamber 476 in registry with a tapered orifice 484 communicating with an outlet chamber 486. Input to the chamber 476 occurs through an air line 488 attached by means of a branch line 488b to a vehicle wheel speed sensor 490, and by means of a branch line 488a to a vehicle speed sensor 492. The sensor 490 is responsively connected to a vehicle wheel 494. The sensor 492 is responsively connected to a rotatable member 496.

The sensors 490 and 492 may be of the type previously described and illustrated in FIGS. 8 and 9 since such valves can be operated as vacuum devices as well as with a fluid. The rotatable member 496 can be an inertially responsive flywheel such as previously described and shown in FIGS. 3-6, or FIG. 13 or in the alternative, the road engaging wheel 294, as previously described and shown in FIG. 15. The centrifugal force assembly 340, as shown in FIGS. 16-17, may be used in place of the sensors 490 and 492.

Disposed within the cylinder 474 is a plate 498 which slidably engages the interior walls of the cylinder 474 in an air tight manner to define chambers 472 and 500 on either side thereof. A pair of bleeder channels 502 and 504 allow a quantity of air into the chambers 500 and 472, respectively, to allow the plate 498 to be moved back and forth within the cylinder 474, caused by the operation of the pedal 454 or by drawing a net negative pressure differential across the plate 498 through the lines 506 and 508. Negative pressure to operate the wheel speed sensor 490 is introduced therein through an air line 488b from the valve 422. Negative pressure to operate the vehicle speed sensor 492 is introduced therein through an air line 488a from the valve 422. A shaft 510 is attached at one end of the plate 498 and projects out of the cylinder 474 into operative engagement with a vehicle wheel brake master cylinder 512 of the type commonly found in modern automobiles.

In typical operation, the vacuum reservoir 410 pulls a vacuum on the chamber 446 of the valve 418 and the chambers 486 and 476 of the valve 422 when the vehicle brake pedal 454 is inoperative. The vacuum thus created in the chamber 476, in turn, pulls a light vacuum on the line 488 and the wheel and vehicle speed sensors 490 and 492 when the brake pedal 454 and valve 418 are inoperative. As long as the vehicle and the vehicle wheel 494 are moving at the same speed, equal negative pressures are drawn through the lines 506 and 508 on the chambers 500 and 472, respectively, so only the net force of the brake pedal 454 on the plunger 466 will cause the plate 498 to move. When the brake pedal 454 is manually depressed to force the shafts 466, 470 and 510 to operate the brake master cylinder 512, the valve 418 operates to draw a vacuum through the line 458 on the chamber 460. The vacuum thus drawn on the chamber 460 tends to aid the manual brake operation transferred by the brake pedal 454 through the shafts 466, 470 and 510 to the brake master cylinder 512. The negative pressure drawn on the chamber 460 through the line 458 is a function of the foot pressure applied to the brake pedal 454.

During the braking operation, should the wheel 494 begin to rotate at a speed slower than the vehicle as a whole, as indicated by the rotatable member 496, then a greater vacuum will be drawn on the chamber 472 than on the chamber 500 so that the cylinder 474 will tend to unload the braking force applied to the brake master cylinder 512 to limit the tendency of the vehicle wheel 494 to skid. Similarly, if the vehicle is accelerated such that the wheel 494 tends to spin at a speed greater than the speed of the vehicle as a whole, a greater negative pressure will be drawn on the chamber 500 than on the chamber 472 such that the be drawn on the chamber 500 than on the chamber 472 such that the cylinder 474 will tend to load the brake master cylinder 512 to limit the tendency of the wheel 494 to spin.

Referring now to FIG. 19, the basic principal of operation of the brake control system of my invention, is illustrated in block diagram form. A driving signal source 520 is operatively connected to a vehicle speed sensing means 522 and a wheel speed sensing means 524. The vehicle speed sensing means 522 is responsively connected to a rotatable member 526 of the type previously described, the speed of which is substantially proportional to the speed of the vehicle as a whole. The wheel speed sensor 524 is responsively connected to a vehicle wheel 528. The sensing means 522 and 524 are adapted to generate signals which are a function of the speed of the vehicle and of the wheel 528, respectively. Where the means 522 and 524 consist of valves as previously described and shown in FIGS. 8 and 9, it should be noted that they do not generate fluid signals whose pressure is directly proportional to vehicle and wheel speed because, for any given vehicle and wheel speed, the input signal pressure to the chambers 166 (FIGS. 8 and 9) will vary depending upon the foot pressure applied to the vehicle brake which, in turn, controls the fluid pressure on the line 54 from the valve 48 (See FIG. 2). However, since the same pressure from the valve 48 of FIG. 2 drives both the wheel speed sensor and the vehicle speed sensor, the difference between the output signals from the fluid valve of FIGS. 8-9 will be substantially proportional to the difference in vehicle and wheel speed even though the input signals to the sensors do not represent the actual speed of either the vehicle or the wheel. Of course, if the system is adapted so as to present input signals to the wheel and vehicle speed sensors, respectively, which are directly proportional to the speed of the wheel and the vehicle, then the output signals of the sensors will be directly proportional to the speed of the wheel and the vehicle. However, such a proportionality is not essential so long as the same driving signal is used to supply the input signal to both sensors. In the latter case, the comparing means 530 will cancel any non-linear variations in the signals supplied from the source 520 to the sensors 522 and 524 and will respond only to the difference between the signals supplied to it as generated by the sensors themselves. The comparing means 530 is adapted to generate an output signal consisting of a net pressure difference across the actuating element of the comparing means 530 (the plate 498 of FIG. 18, for example). This output signal translates into a net force to load or unload the wheel brake 532 so as to limit the difference between the signals generated by the sensors 522 and 524 and, consequently, the net pressure differential across the actuating element of the comparing means 530. The system is, therefore, a continuously operating negative feedback control system adapted to eliminate the difference between the speeds of the wheels of a vehicle and the vehicle as a whole, subject to the sensitivity of the system, of course.

The system of the instant invention can also be provided using electrical and electronic circuitry and components to perform the functions analogous to the fluid and vacuum systems illustrated in the previous examples. Referring to FIG. 19 again, for purposes of illustration, the driving signal source 520 may be a battery which supplies an electrical potential difference to the vehicle and wheel speed sensing means 522 and 524. The means 522 and 524 in this case may be electrical generators rotatably connected to the member 526 and the vehicle wheel 528, respectively. The member 526 and wheel 528 thus serve in this case as prime movers or motors to turn the generators. An electronic comparing means 530 suitably adapted to measure the potential difference between the signals generated by the generators 522 and 524 may be provided to generate an output signal proportional to the difference between the signals generated by the generators 522 and 524. The output signal, in turn, may be employed in any suitable and well known manner to actuate a solenoid or valve to load or unload the vehicle wheel brake 532 to limit the difference between the vehicle speed and speed of the wheel 528 in the same manner as illustrated in the previous examples.

Referring to FIG. 2 again, it should be noted that a principal advantage of the brake control valve 52 is that the variable brake pressure control signal thus generated into the line 90 provides the vehicle operator with a direct feel, through his foot, of the amount of braking force which he is manually applying to the vehicle wheel brakes. Thus the system of FIG. 2 incorporates the additional and optional feature of providing the vehicle with power brakes while at the same time providing the operator with a feel for the braking system, the same as manually operated mechanical brakes. It should be noted, however, that the line 90 can be removed from the system of FIG. 2, and the vehicle brakes can be operated in any conventional manner, mechanical or otherwise separate and apart from the system of the instant invention. See particularly the system shown in FIG. 18 wherein the brake pedal 454 manually and mechanically operates the vehicle wheel brake with power to assist from the brake control valve 418 through the line 458. In FIG. 18, the line 458 could be removed consistent with the operation of the system of the instant invention to allow its use with a purely mechanical and manually operated vehicle brake system of conventional and well known type.

With regard to the use of the flywheel of the subject invention, the same should preferably be designed so as to have sufficient inertia to maintain a relatively constant free rotational speed following the application of the vehicle brakes and throughout the time said brakes are continuously applied. In most practical situations it would be rare that vehicle brakes would be continuously applied for more than 10 to 15 seconds. I recommend that the flywheel be adapted to freely rotate at a speed of within about 95 percent of its speed at the time the vehicle brakes are applied during such periods. The accuracy of such a flywheel in measuring the speed of the vehicle is dependent upon the inertial capability thereof, and is, therefore, simply a matter of design choice to meet the accuracy requirements imposed on the system by the designer. For example, a flywheel 6 inches in diameter and weighing 6 pounds will provide more than sufficient inertia to obtain the above-mentioned design characteristics.

As used herein, the terms "vehicle speed sensing means," and "wheel speed sensing means" refer to devices responsive to motion of a vehicle and wheel, respectively and do not necessarily refer to devices which generate only responses which are proportional or substantially proportional to the instantaneous speeds of such vehicle or wheel. While such devices may generate such substantially proportional signals consistent with the instant invention, they need not do so, so long as the signals generated are substantially proportional to the difference between such vehicle and wheel speeds. The system of FIG. 2 which employs the pressure control and brake pedal control valves 48 and 52, respectively, is an example of a brake control system wherein the output signals generated by the vehicle speed sensing means 164 and wheel speed sensing means 188, 190, 192 and 194 are not necessarily proportional to the speed of the vehicle and wheels, although the difference between such signals as sensed by the comparing means 216 is substantially proportional to such speed difference.

The term "substantially proportional" as used herein means, "substantially proportional under steady state conditions," wherein the system has achieved a state of relative dynamic equilibrium in response to any relative change in the difference between the vehicle speed and the speed of any one or more of the vehicle wheels. In any physical system involving the movement of elements, having significant mass, in response to a change to which the system is adapted to respond, there is a transient time period during which the system alters its state in response to such change. During the transient time period, the system is not in dynamic equilibrium and the response of the comparing means of the system of the subject invention will not necessarily be in substantially proportion to the difference between the vehicle and wheel speeds. After the system achieves a condition of steady state air response to a change in the difference between the speed of the vehicle and one or more of the wheels, the response generated by the comparing means will by substantially proportional to the speed difference.

As used herein the term, "fluid operated" includes both hydraulic and pneumatic fluids. The term also applies to vacuum operated systems and components or those which operate on a partial vacuum relative to ambient pressure, since the negative pressure of a vacuum or partial vacuum is a measure of the difference between the vacuum or partial vacuum and the pressure of the fluid contained in the ambient or reference environment.

As used herein the term, "vehicle speed monitoring means," relates to and includes both a rotatable member such as a flywheel or unpowered non-breakable road engaging wheel, and a vehicle speed sensing means such as a fluid valve or centrifugal force unit, or their equivalents.

As used herein, the term, "vehicle and wheel speed sensing means," both relate to a signal generating means such as fluid valves, electrical generators, centrifugal force units, or their equivalents.

Although the subject invention has been described with respect to specific details of certain preferred embodiments thereof, it is not intended that such details limit the instant invention except insofar as is set forth in the following claims.

I claim:

1. A brake pressure control valve comprising
   a housing defining first and second chambers and an inlet orifice adapted for introducing a fluid into said first chamber,
   a movable diaphragm defining a hole therethrough, disposed in said second chamber and attached to said housing in an air tight manner to divide said second chamber into third and fourth chambers,
   a movable plunger projecting partially inside said housing and fourth chamber toward one side of said diaphragm in registry with said hole,
   mounting means attached to the other side of said diaphragm and adapted to allow a fluid to flow through said hole,
   a tapered valve seat formed by said housing and defining a tapered orifice between said first and third chambers opposite said other side of said diaphragm,
   a valve needle tapered in conformity with said seat and disposed in said first chamber in registry with said tapered orifice, said needle being attached through said orifice to said mounting means, biasing means disposed in said housing tending to maintain said diaphragm in a retracted position such that said needle is normally in air tight closing engagement with said tapered orifice, said valve needle being adapted to disengage said tapered orifice in opposition to said biasing means when said plunger is forced against said diaphragm to move said diaphragm to an extended position, said plunger being adapted to close said hole in an air tight manner when said plunger is moved against said diaphragm, said housing defining a vent port for venting a fluid from said fourth chamber and housing, said housing further defining at least one outlet port communicating with said third chamber.

2. A comparing means for a fluid operated automatic brake control system for operating a brake associated with a wheel of a vehicle comprising
a housing defining a chamber,
a linearly translatable shaft disposed in said housing and chamber, in a fluid tight manner,
a first plate fixedly mounted on said shaft and adapted to slidably engage the chamber defining wall of said housing in a fluid tight manner,
means communicating with said chamber on both sides of said first plate for applying a fluid pressure difference across said plate to translate said shaft, said brake being operatively associated with said shaft, and
bleeder means communicating with said chamber on both sides of said first plate for venting a quantity of a fluid from said chamber and housing.

3. The comparing means of claim 2 further comprising a manually operated vehicle brake control system operatively associated with said shaft.

4. A comparing means for a fluid operated automatic brake control system for operating a brake of a wheel of a vehicle comprising
a housing defining a chamber,
a linearly translatable shaft disposed in said housing and chamber,
a first plate fixedly mounted on said shaft and adapted for air tight slidable engagement with the chamber defining wall of said housing,
a second plate spaced from said first plate and mounted on said shaft on one side of said first plate and adapted for air tight slidable engagement with said chamber defining wall,
a third plate spaced from said first plate and mounted on said shaft on the other side of said first plate and adapted for slidable engagement with said chamber defining wall,
a pair of fluid inlet channels defined by said housing and communicating with said chamber between said first and second plates and between said first and third plates, respectively, for venting a quantity of a fluid from said chamber and housing, and
bleeder means communicating with said chamber between said first and second plates and between said first and third plates, for venting a quantity of fluid from said chamber, said first plate having a broad surface area larger than a broad surface area of said second plate, and larger than a broad surface area of said third plate, said shaft being operatively associated with said brake.

5. A device for indicating the speed of a vehicle comprising
a rotatable shaft disposable in said vehicle,
a flywheel fixedly mounted on said shaft,
a pair of spaced brake pads disposed opposite one another and both broad sides of a peripheral base portion of said flywheel,
a yoke having a periphery forming a portion of a circle said pads being attached to opposing ends of said yoke,
biasing means attached to said yoke and tending to maintain said pads spaced from said flywheel,
a pivot pin disposed through a base of said yoke equidistant from said pads and adapted to support said yoke, said yoke being pivotal about said pin in opposition to said biasing means to affect alternate slidable engagement of said pads with said flywheel,
a massive pendulum assembly pivotally attached at one end to said pin and adapted to maintain a plumb position beneath said yoke relative to earth, and
plunger means attached to said assembly having a retracted position spaced from the circular periphery of said yoke and an extended position engaging said circular periphery to lock the angular disposition of said assembly relative to the base of said yoke, said plunger means being responsively connectable to a manually operative brake system of said vehicle to produce said extended position when said system is operative.

6. The device of claim 5 wherein said plunger means comprises a spring biased fluid operable cylinder.

7. A system for automatically controlling a brake applicable to a wheel of a vehicle comprising
vehicle speed monitoring means including
a rotatable flywheel responsively connected to an unpowered wheel of said vehicle when a vehicle brake, manually applicable to a wheel of said vehicle, is inoperative,
means for disconnecting said flywheel from said unpowered wheel for permitting said flywheel to rotate independent of said unpowered wheel when said brake is operative,
inertial means for frictionally decelerating said flywheel as a function of the rate of deceleration of said vehicle, and
fluid valve sensing means responsively associated with said flywheel for generating a first fluid signal which is at least partially dependent upon the rotational speed of said flywheel,
wheel speed sensing means responsively connected to said brake applicable wheel for generating a second fluid signal which is at least partially dependent upon the rotational speed of said brake applicable wheel, and
comparing means responsively connected to said monitoring and wheel speed sensing means for generating a response which is substantially proportional to a difference between said first and second signals, said comparing means being operatively associated with with said brake to limit said difference.

8. The system of claim 7 wherein said disconnecting means comprises
a brake pressure control means responsively connected to a manually operable brake means of said vehicle, said brake pressure control means generating a disconnect signal when said brake means is operative, and a valve means responsively connected to said brake pressure control means and operatively associated with said flywheel for disconnecting said flywheel from said unpowered wheel in response to said disconnect signal, and for connecting said flywheel to said unpowered wheel when said disconnect signal ceases.

9. The system of claim 7 wherein said wheel speed sensing means comprises a housing defining a concave base and spaced inlet, outlet and storage chambers opening onto said base, and a rotatable collar means adapted to slidably engage said base in close conforming relation, said collar means defining at least one recess in the periphery of said collar adapted to alternately connect said inlet and storage chambers together, and said storage and outlet chambers together, during successive periods of time during each rotation of said collar means.

10. The system of claim 9 further comprising means for adjusting the capacity of said storage chamber.

11. The system of claim 10 wherein said adjusting means comprises a threaded member projecting at least partially into said housing and storage chamber, the depth of the projection of said member into said storage chamber being manually adjustable to vary the volume of said storage chamber.

12. The system of claim 7 wherein said fluid valve sensing means comprises a housing defining a concave base and spaced inlet, outlet and storage chambers opening onto said base, and rotatable collar means adapted to slidably engage said base in close conforming relation, said collar means defining at least one recess in the periphery of said collar means adapted to alternately connect said inlet and storage chambers together, and said storage and outlet chambers together during successive periods of time during each rotation of said collar means.

13. The system of claim 12 further comprising means for adjusting the capacity of said storage chamber.

14. The system of claim 13 wherein said adjusting means comprises a threaded member projecting at least partially into said housing and storage chamber, the depth of the projection of said member into said storage chamber being manually adjustable to vary the volume of said storage chamber.

15. The system of claim 7 wherein said comparing means comprises a cylinder responsively connected to said monitoring and wheel speed sensing means, said cylinder being adapted to generate a positive force on said brake when said wheel speed is greater than said vehicle speed, and being adapted to generate a negative force to at least partially unload said brake when said wheel speed is less than said vehicle speed.

16. The system of claim 7 further comprising mechanical overriding means for manually applying said brake to said wheel upon failure of said fluid power source.

17. The system of claim 7 wherein said wheel speed sensing means comprises a centrifugal force unit rotatably connected to said wheel and adapted to produce a force substantially proportional to the rotational speed of said wheel, and means responsive to said force and operatively connected to said comparing means for applying said brake when said wheel speed is greater than the speed of said vehicle.

18. The system of claim 7 wherein said fluid valve sensing means comprises a centrifugal force unit rotatably connected to said rotating means and adapted to produce a force substantially proportional to the speed of said vehicle, and means responsive to said force and operatively connected to said comparing means for at least partially unloading said brake when said vehicle speed is greater than said wheel speed.

19. A system for automatically controlling a braking force of a brake manually applicable to a wheel of a vehicle for limiting the tendency of said vehicle wheel to skid comprising vehicle speed monitoring means including a rotatable flywheel responsively connected to an unpowered wheel of said vehicle when a vehicle brake, manually applicable to a wheel of said vehicle is inoperative, means for disconnecting said flywheel from said unpowered wheel for permitting said flywheel to rotate independent of said unpowered wheel when said brake is operative, inertial means for frictionally decelerating said flywheel as a function of the rate of deceleration of said vehicle, and fluid valve sensing means responsively associated with said flywheel for generating a first fluid signal which is at least partially dependent upon the rotational speed of said flywheel, wheel speed sensing means responsively connected to said wheel for generating a second signal dependent upon the rotational motion of said wheel, a fluid driving signal source operatively connected to said monitoring and wheel speed sensing means, and comparing means responsively connected to said monitoring and wheel speed sensing means for generating a response which is substantially proportional to a difference between the speeds of said vehicle and wheel, said comparing means being operatively associated with said brake to at least partially unload said braking force when said brake is manually applied to said wheel by an amount dependent upon said difference.

20. A system for automatically controlling a braking force of a brake applicable to a power driven wheel of a vehicle, for limiting the tendency of said power driven wheel to spin comprising vehicle speed monitoring means including a rotatable flywheel responsively connected to an unpowered wheel of said vehicle when a vehicle brake, manually applicable to a wheel of said vehicle is inoperative, fluid valve sensing means responsively associated with said flywheel for generating a first fluid signal which is at least partially dependent upon the rotational speed of said flywheel, wheel speed sensing means responsively connected to a power driven wheel of said vehicle for generating a second fluid signal which is at least partially dependent upon the rotational speed of said power driven wheel, a fluid driving signal source operatively associated with said monitoring and wheel speed sensing means, and comparing means responsively connected to said monitoring and wheel speed sensing means for generating a response which is substantially proportional to a difference between the speeds of said vehicle and power driven wheel, said comparing means being operatively associated with said brake to apply said braking force to said power driven wheel by an amount dependent upon said difference.

21. A system for automatically controlling vehicle wheel brakes for limiting the tendency of the wheels of a vehicle from skidding or spinning comprising
vehicle speed monitoring means including
a rotatable flywheel responsively connected to an unpowered wheel of said vehicle when a vehicle brake, manually applicable to a wheel of said vehicle, is inoperative,
means for disconnecting said flywheel from said unpowered wheel for permitting said flywheel to rotate independent of said unpowered wheel when said brake is operative,
inertial means for frictionally decelerating said flywheel as a function of the rate of deceleration of said vehicle, and
fluid valve sensing means responsively associated with said flywheel for generating a first fluid signal which is at least partially dependent upon the rotational speed of said flywheel,
wheel speed sensing means responsively connected to the brake applicable wheels of said vehicle and to its power driven wheels for generating a series of signals, each of said series being dependent upon the rotational motion of a different one of said wheels, and
comparing means responsively connected to said monitoring and wheel speed sensing means for generating a series of response signals being dependent upon a difference between said vehicle speed and the speed of a different one of said wheels, said comparing means being operatively associated with each of said brake applicable wheels for unloading each of said brakes to limit the tendency of said brake applicable wheels to skid, and for loading each of said brakes applicable to a power driven wheel of said vehicle to limit the tendency of each of said power driven wheels to spin.

22. A system for automatically controlling a brake applicable to a weight bearing wheel of a vehicle comprising
a fluid driving signal source,
rotating means separate and distinct from the weight bearing wheels of said vehicle, the speed of rotation of which is substantially proportional to the speed of said vehicle,
fluid valve vehicle speed sensing means connected to said source and rotating means for generating a first fluid signal which is at least partially dependent upon the speed of said rotating means,
fluid valve wheel speed sensing means connected to said source and to a weight bearing wheel of said vehicle for generating a second fluid signal which is at least partially dependent upon the speed of said weight bearing wheel, a difference between said first and second signals being substantially proportional to the difference between the speeds of said vehicle and weight bearing wheel, and
comparing means responsively connected to said vehicle and wheel speed sensing means for generating a response which is substantially proportional to said difference, said comparing means being operatively associated with said brake to limit said difference.

23. The system of claim 22 wherein said rotating means comprises a substantially non-weight bearing freely rotatable road engaging wheel attached to said vehicle.

24. A system for controlling a brake applicable to a wheel of a vehicle comprising
first rotating means separate and distinct from the weight bearing wheels of said vehicle, the speed of rotation of which is substantially proportional to the speed of said vehicle,
second rotating means responsively connected to said brake applicable wheel, the speed of rotation of which is substantially proportional to the speed of said brake applicable wheel,
fluid valve vehicle speed sensing means responsively connected to said first rotating means for generating a first fluid signal which is at least partially dependent upon the speed of said vehicle,
fluid valve wheel speed sensing means responsively connected to said second rotating means for generating a second fluid signal which is at least partially dependent upon the rotational speed of said brake applicable wheel, a difference between said first and second signals being substantially proportional to the difference between the speeds of said vehicle and brake applicable wheel, and
comparing means responsively connected to said vehicle and wheel speed sensing means for generating a brake controlling response which is substantially proportional to said difference, said comparing means being operatively associated with said brake to limit said difference.

25. A fluid operated system for automatically controlling a brake applicable to a wheel of a vehicle of the type having manually operative brake means comprising
a pressurized fluid power source,
a fluid brake control valve responsively connected to said source and brake means for generating a fluid brake control signal which is dependent upon a force manually applied to said brake means,
vehicle speed monitoring means responsively connected to said brake control valve for generating a first fluid signal dependent upon the speed of said vehicle and the value of said brake control signal,
wheel speed sensing means responsively connected to said wheel and brake control valve for generating a second fluid signal dependent upon the speed of said wheel and the value of said brake control signal, and
comparing means responsivley connected to said monitoring and wheel speed sensing means for generating a response which is substantially proportional to a difference between said first and second signals, said comparing means being operatively associated with said brake to limit said difference when said wheel speed is less than said vehicle speed.

26. The system of claim 25 further comprising a fluid pressure control valve responsively connected to said source and brake control valve for generating a first pressure level fluid system control signal when said brake control valve is inoperative, and for generating a second pressure level system control signal when said brake control valve is operative, said pressure control valve being operatively connected to said monitoring and wheel speed sensing means between said brake control valve and said monitoring and wheel speed sensing means, said comparing means also being operatively associated with said brake to limit said difference when said wheel speed is greater than said vehicle speed.

27. The system of claim 26 further comprising means connected between said source and said monitoring and wheel speed sensing means for by-passing said pressure control valve to supply a relatively high magnitude fluid pressure signal to said monitoring and wheel speed sensing means when said wheel speed is greater than said vehicle speed for improving the effectiveness of said comparing means in response to said difference.

28. The system of claim 27 wherein said by-passing means comprises
    a fluid by-passing valve connected between said source and said monitoring and wheel speed sensing means, having an open condition for passing said relatively high magnitude fluid pressure signal therethrough and a closed condition for stopping the passage of said relatively high magnitude fluid pressure signal therethrough, and
    means for opening said by-pass valve when said wheel speed is greater than said vehicle speed, and for closing said by-pass valve when said vehicle speed is at least equal to said wheel speed.

29. The system of claim 28 wherein said opening means comprises an electrically actuated solenoid responsively connected electrically, to a brake light of said vehicle.

30. The system of claim 25 further comprising fluid means responsively connected to said brake control valve and operatively associated with said brake for operating said brake in response to said force manually applied to said brake means.

31. A fluid operated valve comprising
    a housing defining a concave base and spaced inlet, outlet, and storage chambers opening onto said base, and
    rotatable collar means adapted to slidably engage said base in close conforming relation, said collar means defining at least one recess in the periphery of said collar adapted to alternately connect said inlet and storage chambers together, and said storage and outlet chambers together, during successive periods of time during each rotation of said collar means.

32. The valve of claim 31 further comprising means for adjusting the capacity of said storage chamber.

33. The valve of claim 32 wherein said adjusting means comprises a threaded member projecting at least partially into said housing and storage chamber, the depth of the projection of said member into said storage chamber being manually adjustable to vary the volume of said storage chamber.

34. The valve of claim 31 wherein said collar means comprises a disc shaped member.

35. A device for indicating the speed of a wheeled vehicle comprising
    a rotatable flywheel responsively connected to an unpowered wheel of said vehicle when a vehicle brake, manually applicable to a wheel of said vehicle, is inoperative,
    means for disconnecting said flywheel from said unpowered wheel for permitting said flywheel to rotate independent of said unpowered wheel when said brake is operative,
    inertial means for frictionally decelerating said flywheel as a function of the rate of deceleration of said vehicle, and
    fluid valve sensing means responsively associated with said flywheel for generating a first fluid signal which is at least partially dependent upon the rotational speed of said flywheel.

36. The divice in claim 35 wherein said disconnecting means comprises a fluid valve.

37. The device of claim 35 wherein said inertial means comprises
    a brake pad, and
    means for bringing said brake pad and inertial means into sliding frictional engagement upon deceleration of said vehicle.

38. The device of claim 35 further comprising
    a first rotatable shaft, said flywheel being fixedly attached to said first shaft to rotate in unison therewith,
    a first gear mounted about said first shaft and adapted to rotate in unison therewith,
    a second rotatable shaft spaced from said first shaft and connectable to said unpowered wheel to rotate at a speed substantially proportional thereto,
    a second gear mounted on said second shaft and adapted for operative engagement with said first gear, said second gear being adapted to rotate in unison with said second shaft, and
    means for disengaging said gears in response to the application of said brake.

39. The device of claim 38 further comprising
    a circular hollow collar mounted on said first shaft and adapted to rotate in unison with said first shaft, said collar and first shaft being adapted to translate longitudinally relative to one another, and
    means for restraining said circular hollow collar from translating longitudinally when said first shaft translates longitudinally, said first gear also being mounted on said collar.

40. A vehicle and wheel speed sensing assembly comprising
    a first rotatable centrifugal force unit adapted to produce a first force substantially proportional to the speed of a vehicle,
    a second rotatable centrifugal force unit disposed adjacent said first unit and adapted to produce a second force substantially proportional to the speed of rotation of a wheel of said vehicle, said second force being directed toward said first unit opposite the direction of said second force,
    an elongated pivot arm pivotally connected at a position intermediate the ends of said arm to a fixed point spaced from and perpendicular to the point of intersection of said forces when said forces are equal in magnitude, one end of said arm being disposed between said units such that said arm pivots about said position when the magnitude of one of said forces exceeds the magnitude of the other of said forces,
    a pair of fluid valves disposed opposite one another on either side of the other end of said arm, and a pair of plunger rods attached to said other end of said arm and extending outward from said arm on opposite sides thereof, each of said rods being operatively associated with a different one of said valves, a fluid output signal from each of said valves being substantially equal when said forces are equal in magnitude, a difference between each said output signal being dependent upon the amount of rotation of said arm about said position and a difference between said forces.

41. A method for controlling a brake applicable to a wheel of a vehicle, the steps of which comprise monitoring the speed of said vehicle, sensing the speed of rotation of said wheel, simultaneously comparing said vehicle and wheel speeds, generating a response dependent upon the difference between said vehicle and wheel speeds, operating said brake to limit said difference, providing a power source, having a relatively high level output signal, reducing the level of said signal to a relatively low level when said wheel speed is equal to said vehicle speed, and utilizing said signal, so reduced to operate vehicle and wheel speed sensing means, for generating said response.

42. The method of claim 41, the steps of which further compromise the step of connecting said source to said sensing means when said wheel speed is greater than said vehicle speed.

43. The method of claim 41, the steps of which further comprise the step of increasing the level of said signal, so reduced, by an amount dependent upon a force manually applied to said brake.

* * * * *